(12) United States Patent
Isamikawa et al.

(10) Patent No.: US 9,843,691 B2
(45) Date of Patent: Dec. 12, 2017

(54) IMAGE DISPLAY DEVICE, IMAGE DISPLAY SYSTEM, IMAGE DISPLAY METHOD, AND COMPUTER-READABLE STORAGE MEDIUM FOR COMPUTER PROGRAM

(71) Applicant: Konica Minolta, Inc., Tokyo (JP)

(72) Inventors: Junichi Isamikawa, Tokyo (JP); Hiroki Ueda, Aichi (JP); Hiroshi Sugiura, Aichi (JP); Mitsuharu Nagai, Aichi (JP)

(73) Assignee: Konica Minolta, Inc., Tokyo (JP)

( * ) Notice: Subject to any disclaimer, the term of this patent is extended or adjusted under 35 U.S.C. 154(b) by 493 days.

(21) Appl. No.: 14/635,344

(22) Filed: Mar. 2, 2015

(65) Prior Publication Data
US 2015/0264205 A1    Sep. 17, 2015

(30) Foreign Application Priority Data

Mar. 11, 2014   (JP) ................................. 2014-047093

(51) Int. Cl.
| | | |
|---|---|---|
| G06K 15/00 | (2006.01) | |
| H04N 1/00 | (2006.01) | |
| G06F 3/0484 | (2013.01) | |
| G06F 3/0485 | (2013.01) | |

(52) U.S. Cl.
CPC ....... *H04N 1/00477* (2013.01); *G06F 3/0485* (2013.01); *G06F 3/04847* (2013.01); *H04N 1/0049* (2013.01); *H04N 1/00411* (2013.01); *H04N 1/00413* (2013.01); *H04N 1/00424* (2013.01); *H04N 1/00435* (2013.01); *H04N 1/00474* (2013.01); *H04N 1/00482* (2013.01); *H04N 2201/0094* (2013.01)

(58) Field of Classification Search
None
See application file for complete search history.

(56) References Cited

U.S. PATENT DOCUMENTS

2007/0176946 A1*  8/2007  Matoba ................ G03G 15/502
                                                    345/619
2008/0192283 A1*  8/2008  Kobayashi ......... H04N 1/00408
                                                    358/1.15

FOREIGN PATENT DOCUMENTS

| JP | 2000-235549 A | 8/2000 |
|---|---|---|
| JP | 2010-123047 A | 6/2010 |

* cited by examiner

*Primary Examiner* — Huo Long Chen
(74) *Attorney, Agent, or Firm* — Osha Liang LLP

(57) ABSTRACT

An image display device reproducing an image displayed according to operations performed consecutively is provided. The device includes an extraction portion extracting, from the operations, a plurality of times of first operations to scroll through the image, and a position at which an operation is made in a display surface of an object selected from the image through second operation performed after the plurality of times of first operations; and a reproduction portion that reproduces the image in accordance with the operations in such a manner that scrolling through the image is omitted or shortened in accordance with a target operation which is any one of a specific operation and a subsequent first operation among the plurality of times of first operations. The specific operation is to scroll through the image in a manner to move the object from one side to the other side when viewed from the position.

20 Claims, 27 Drawing Sheets

FIG. 11

| 201 | 202 | 203 | 204 | 205 |
|---|---|---|---|---|
| NUMBER | SCREEN ID/SCROLL STATE | ELAPSED TIME (TIME) | TYPE | OTHER ATTRIBUTES |

| | | | | |
|---|---|---|---|---|
| A1 | INITIAL | | TAP | COORDINATES (X1, Y1) |
| A2 | APPLICATION/Xa | 2 SEC. | FLICK | START COORDINATES, END COORDINATES, SPEED |
| A3 | APPLICATION/Xb | 4 SEC. | FLICK | START COORDINATES, END COORDINATES, SPEED |
| A4 | APPLICATION/Xc | 5 SEC. | FLICK | START COORDINATES, END COORDINATES, SPEED |
| A5 | APPLICATION/Xd | 7 SEC. | FLICK | START COORDINATES, END COORDINATES, SPEED |
| A6 | APPLICATION/Xe | 9 SEC. | FLICK | START COORDINATES, END COORDINATES, SPEED |
| A7 | APPLICATION/Xf | 10 SEC. | TAP | COORDINATES (X7, Y7) |
| A12 | MIRROR IMAGE | 12 SEC. | | |
| | | 18 SEC. | KEY PRESSED | START KEY |

LOG 200

⇒

(B)

| | | | | |
|---|---|---|---|---|
| B1 (A1) | INITIAL | | TAP | COORDINATES (X1, Y1) |
| B2 (A2) | APPLICATION/Xa | 2 SEC. | FLICK | START COORDINATES, END COORDINATES, SPEED |
| B3 (A3) | APPLICATION/Xb | 4 SEC. | FLICK | START COORDINATES, END COORDINATES, SPEED |
| B4 (A7) | APPLICATION/Xf | 5 SEC. | TAP | COORDINATES (X7, Y7) |
| B9 (A12) | MIRROR IMAGE | 7 SEC. | | |
| | | 13 SEC. | KEY PRESSED | START KEY |

REPRODUCTION LOG 250

FIG. 19

| NAME | SAVE LOCATION | SAVE DATE |
|---|---|---|
| BOOKLET | BOX | 2014. 01. 23 10:45 |
| MIRROR IMAGE COPY | BOX | 2014. 02. 14 16:08 |
| 2 IN 1 | SERVER | 2014. 02. 14 16:12 |
| DUAL PAGE | USB MEMORY | 2014. 02. 15 18:37 |
| ⋮ | ⋮ | ⋮ |

REPRODUCTION SETTINGS 1

WHICH RECORD OF OPERATION IS TO BE REPLAYED?

OK

FIG. 22
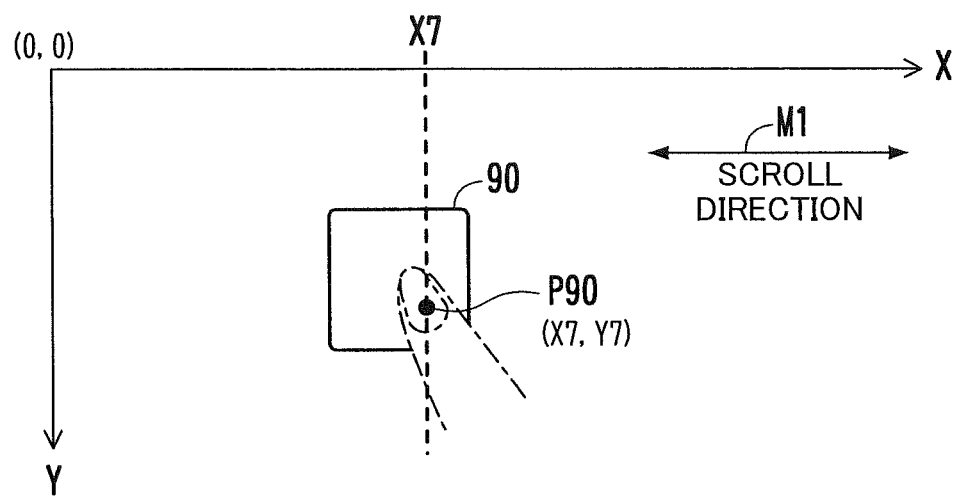
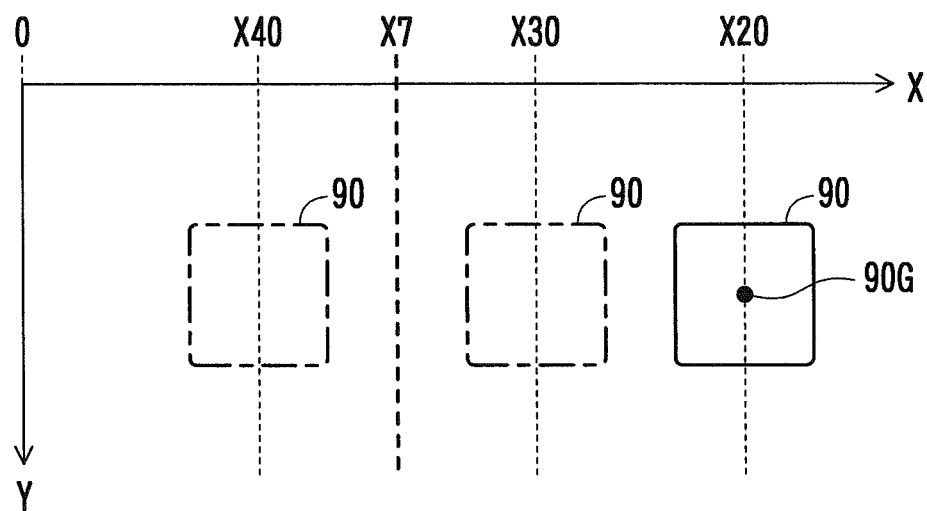

IMAGE DISPLAY DEVICE, IMAGE DISPLAY SYSTEM, IMAGE DISPLAY METHOD, AND COMPUTER-READABLE STORAGE MEDIUM FOR COMPUTER PROGRAM

This application is based on Japanese patent application No. 2014-047093 filed on Mar. 11, 2014, the contents of which are hereby incorporated by reference.

BACKGROUND OF THE INVENTION

1. Field of the Invention

The present invention relates to a technology for reproducing a screen displayed according to an operation.

2. Description of the Related Art

A technology has been used for making a record of an operation with a mouse on a personal computer, and reproducing the movement of a mouse cursor on a display as the operation with the mouse is performed. For example, a method has been disclosed in which, when the movement of a mouse cursor is reproduced, replaying a record is synchronized with a computer response to an operation, which makes it possible to obtain the same processing result as that for making the record (Japanese Laid-open Patent Publication No. 2000-235549).

An information processing device has been proposed in which, for displaying a web page offline, web pages stored are switched and displayed in accordance with historical information on operations performed in order to obtain the stored web pages (Japanese Laid-open Patent Publication No. 2010-123047).

On the other hand, an information device having a touch panel display as an operation input device is configured to scroll through an image which is larger than a display surface only in the up-down direction, only in the right-left direction, or both the up-down and right-left direction. In one example, a scroll region is provided in an operating screen used to make settings for facsimile communication, and a list of communication destinations is scrolled through in the scroll region. In another example, buttons that cannot be displayed at one time in the display surface are scrolled through to appear little by little in the display surface.

In recent years, as an operation for a user to give a scroll command to scroll the displayed content, "flick" and "drag" have been used. The "flick" and "drag" are operations through slide gestures made by touching a touch surface by the user and shifting a touched location with the touch surface touched by the user. A configuration is sometimes used which accepts the operations through "flick" and "drag" in addition to conventional operations such as tapping onto a scroll button.

In an information device where a variety of settings can be made on a touch panel display of an operating panel, e.g., in a Multi-functional Peripheral (MFP) which is a composite information device, it is possible to provide a user assistance function with which a transition of screens depending on an operation is reproduced. The user assistance function is utilized, for example, as follows: "A series of operations made by a user A who is familiar with operation on the information device is recorded, and a user B who is not familiar with the operation replays the record; and the user B looks at a screen reproduced in order to learn the series of operations."

The user B desires a record of an operation which enables the user B to make intended settings soon. Unfortunately, however, it is difficult for the user A to perform the best sample operation desired by the user B.

SUMMARY

The present disclosure has been achieved in light of such an issue, and therefore, an object of an embodiment of the present invention is to provide an environment for reproduction useful to a user who sees a reproduced screen without placing a heavy burden on a person whose operation is recorded.

An image display device according to one aspect of the present invention is an image display device for reproducing an image displayed in a display surface according to a plurality of operations performed consecutively. The image display device includes an extraction portion configured to extract, from historical data on the plurality of operations, first data on a plurality of times of first operations to give a command to scroll through the image, and second data indicating a position at which an operation is made in the display surface of an object selected from the image through second operation performed after the plurality of times of first operations; a determination portion configured to determine whether or not the plurality of times of first operations include a specific scroll operation to give a command to scroll through the image in such a manner that the object moves from one side to another one side when viewed from the position indicated in the second data; and a reproduction portion configured to reproduce, when the determination portion determines that the plurality of times of first operations include the specific scroll operation, the image in accordance with the plurality of operations in such a manner that scrolling through the image is omitted or a time to scroll through the image is shortened in accordance with a target operation, the target operation being any one of the specific scroll operation and a subsequent first operation among the plurality of times of first operations.

These and other characteristics and objects of the present invention will become more apparent by the following descriptions of preferred embodiments with reference to drawings.

BRIEF DESCRIPTION OF THE DRAWINGS

FIG. 11 is a diagram showing an example of items of a log record.

FIG. 17 is a diagram showing an example of logs.

FIG. 19 is a diagram showing an example of a screen used to make settings related to replay of a log.

FIG. 22 is a diagram showing an example of the relationship between a touched location on a button and a coordinate value of the button.

DESCRIPTION OF THE PREFERRED EMBODIMENTS

Figure 1:
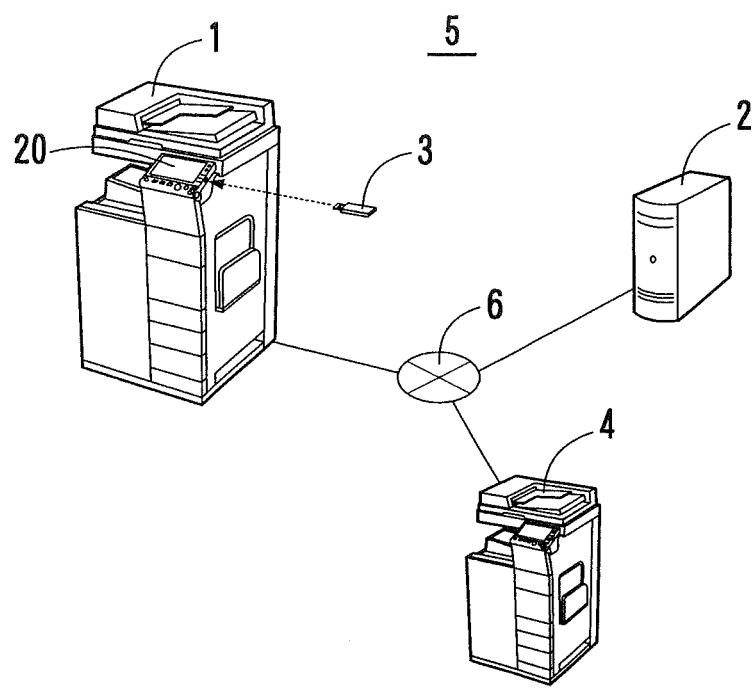
FIG. 1 is a diagram showing an example of the configuration of a screen display system according to an embodiment of the present invention.

Referring to FIG. 1, a screen display system 5 is configured of a first MFP 1, a server 2, a removable memory 3, a second MFP 4, and so on. The MFPs 1 and 4 and the server 2 are connected to one another via a Local Area Network (LAN) 6 constructed in a corporate office. This enables communication among the MFPs 1 and 4 and the server 2. The server 2 and the removable memory 3 are used as storage devices external to the MFPs 1 and 4.

The MFP 1 is a composite information device into which a plurality of functions useful for office work are consolidated. The MFP 1 acts as a copier, printer, network scanner, facsimile device, document server, or the like depending on what kind of job is entered into the MFP 1. The MFP 1 has an operating panel 20 with which a user performs operations. The operating panel 20 has, on its right side, a connector portion which enables the removable memory 3 to attach and detach thereto/therefrom. The removable memory 3 is a so-called USB memory which meets the Universal Serial Bus (USB) standards.

As with the MFP 1, the MFP 4 is also a composite information device. The MFP 4 has a user interface which is the same type as a user interface of the MFP 1. In this embodiment, it is assumed that the MFP 4 is of the same type as the MFP 1, and that the MFP 4 is also equipped with the configuration and functions of the MFP 1 described below. Further, both the MFP 1 and the MFP 4 are so configured that, based on an operation history recorded in one of the MFPs 1 and 4, a screen depending on the recorded operation is reproduced in the other. The MFP 1 and the MFP 4 are configured to send and receive data indicating such an operation history through the server 2 or the removable memory 3.

Figure 2:
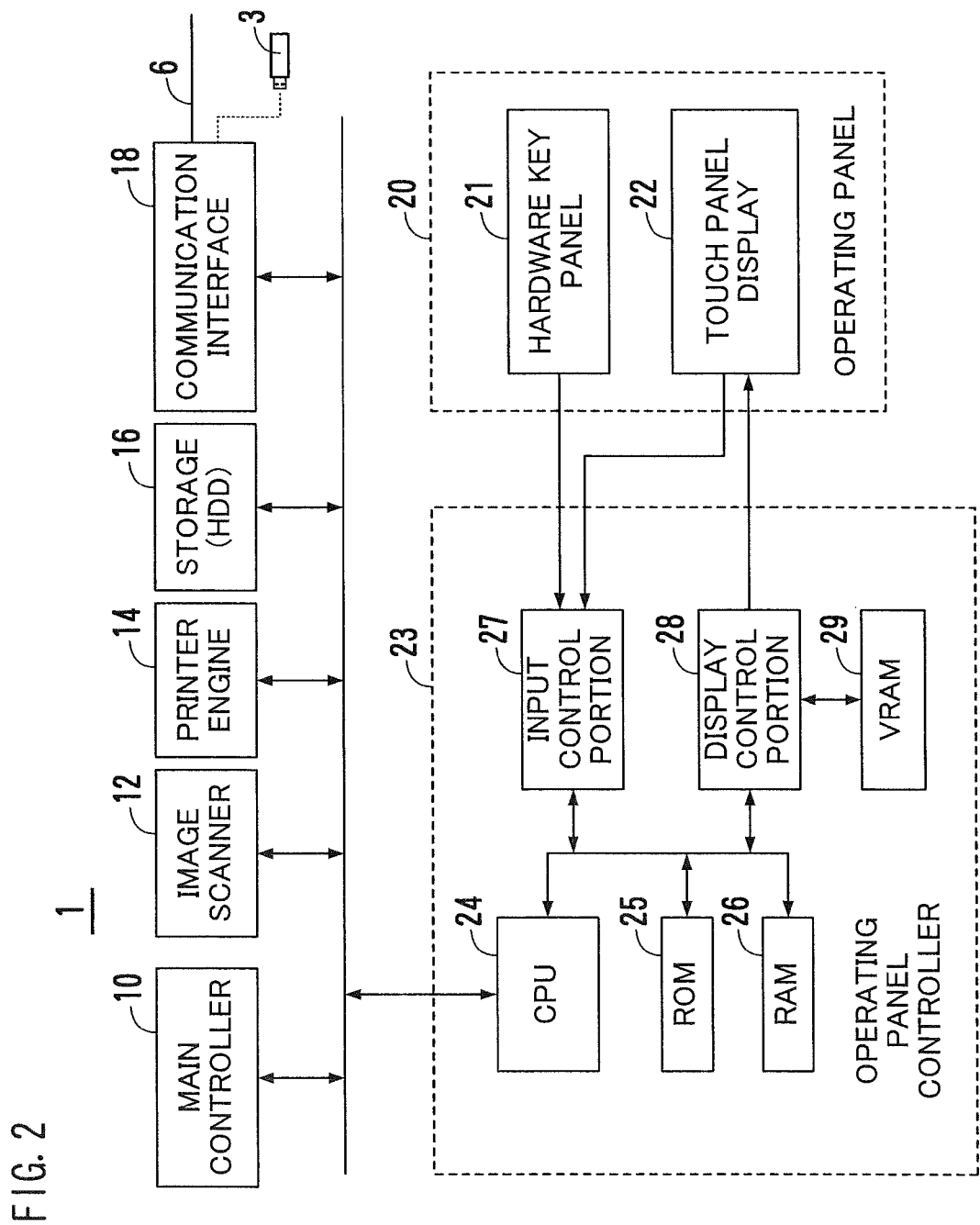
FIG. 2 is a diagram showing an outline of the hardware configuration of an MFP.

FIG. 2 shows an outline of the hardware configuration of the MFP 1. The MFP 1 is provided with a main controller 10 for performing the entire control of the MFP 1, an image scanner 12, a printer engine 14, a storage 16, a communication interface 18, an operating panel 20, an operating panel controller 23, and so on.

The image scanner 12 optically reads an image recorded on a document sheet. In the case of copying, printing, or facsimile reception, the printer engine 14 is operable to print an image onto paper through, for example, electrophotography. The print method may be an inkjet method or any other methods.

The storage 16 is, for example, a hard disk drive. The storage 16 is used to save application programs, and to temporarily store data for data processing. The storage 16 has a memory region called a box. The box is divided into regions such as a personal box assigned to each user and a common box shared by users. In this embodiment, the box is used as one destination to save historical information (log) on operation which can be replayed by a user.

The communication interface 18 enables communication between the MFP 1 and an external device. The communication interface 18 includes a Network Interface Card (NIC) for connecting the MFP 1 to the LAN 6 for communication and a modem for facsimile communication via a public telephone line. The communication interface 18 is also provided with a USB interface for communication with the removable memory 3 attached to the side surface of the operating panel 20 as described above.

The operating panel 20 is provided with a hardware key panel 21 and a touch panel display 22. The hardware key panel 21 has hardware keys provided thereon. The touch panel display 22 is an input/output device which is operable to display a variety of operating screens having buttons as software keys, and to detect a touch action on an operating screen. The touch panel display 22 includes a liquid crystal panel and a capacitive touch-sensitive panel having a translucent touch face adhered to the surface of the liquid crystal panel.

The operating panel controller 23 is configured of a CPU 24, a Read Only Memory (ROM) 25, a Random Access Memory (RAM) 26, an input control portion 27, a display control portion 28, a Video RAM (VRAM) 29, and so on.

The CPU 24 acts as a computer for executing a program related to control over the operating panel 20. The ROM 25 stores therein programs and control data. The RAM 26 is used as a work area for program execution.

The input control portion 27 monitors a detection signal for a key operation sent from the hardware key panel 21, and informs the CPU 24 that the key operation has been made. The input control portion 27 performs lamp control of changing the color of a hardware key when the key is operated. The input control portion 27 also monitors a detection signal for touch action sent from the touch panel display 22, and informs the CPU 24 that the touch action has been made.

Upon receipt of the information from the input control portion 27, the CPU 24 analyzes a command given by the user. In accordance with the command thus analyzed, the CPU 24 informs the main controller 10 of the command, instructs the display control portion 28 to change the display contents, or the like.

The display control portion 28 serves to control a screen displayed on the touch panel display 22. The display control portion 28, as needed, reads out, from the ROM 25, data on objects such as a background image, a button, and a character string all of which constitute a screen related to operation on the MFP 1 and combines such data together, so that a raster image corresponding to a screen to be displayed is drawn on the VRAM 29. The display control portion 28 then sends the raster image to the touch panel display 22, so that the raster image is displayed as an operating screen.

When the user taps a button in the operating screen displayed on the touch panel display 22, in order to show the detection of the button tapped, it is necessary to display animation showing that an indentation is made on the tapped button and the tapped button is soon restored to the original state, or necessary to change the color of the tapped button. The display control portion 28 performs such a process for display in accordance with a command from the CPU 24. When an image is scrolled through, the display control portion 28 also performs animation processing so that the image seems to move smoothly in the display surface. To be specific, the display control portion 28 clips, from the entire data of the image, data of a part to be displayed, draws a raster image, and repeats the drawing of a raster image with the part to be clipped shifted. In parallel with the drawing, the display control portion 28 reads out the drawn raster image from the VRAM 29 to display the raster image on the touch panel display 22.

Figure 3:
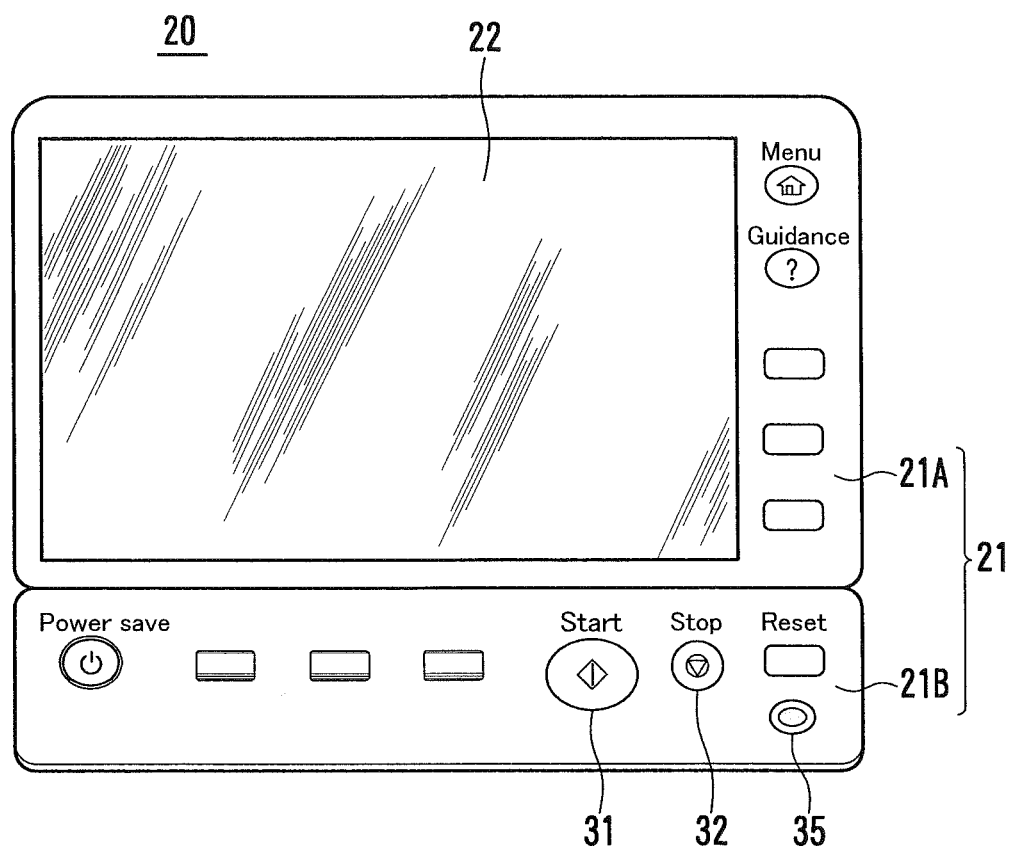
FIG. 3 is a diagram showing an example of the structure of an operating panel of an MFP.

FIG. 3 shows the structure of the operating panel 20 of the MFP 1. The operating panel 20 includes the hardware key panel 21. The hardware key panel 21 has a section 21A provided on the right of the touch panel display 22 and a section 21B provided below the touch panel display 22. On the section 21B, a start key 31, a stop key 32, and a record/replay key 35 are provided.

The start key 31 is used for the user to give a command to start execution of processing. The stop key 32 is used for the user to give a command to cancel or stop processing in progress. The record/replay key 35 is pressed by the user to designate a recording mode in which an operation is recorded, and to designate a replay mode in which a record of an operation is replayed.

Hereinafter, the configuration and operation related to reproduction of a screen in the MFP 1 are described.

The MFP 1 has a function to, in a state where the recording mode is selected, use the operating panel 20 to make a record of an operation made by the user, and has a function to replay a log of the recorded operation. In replaying the log, transition in display contents on the screen as the recorded operation has been performed is reproduced. In order to replay the log, it is necessary for the user to designate the replay mode.

Figure 4:
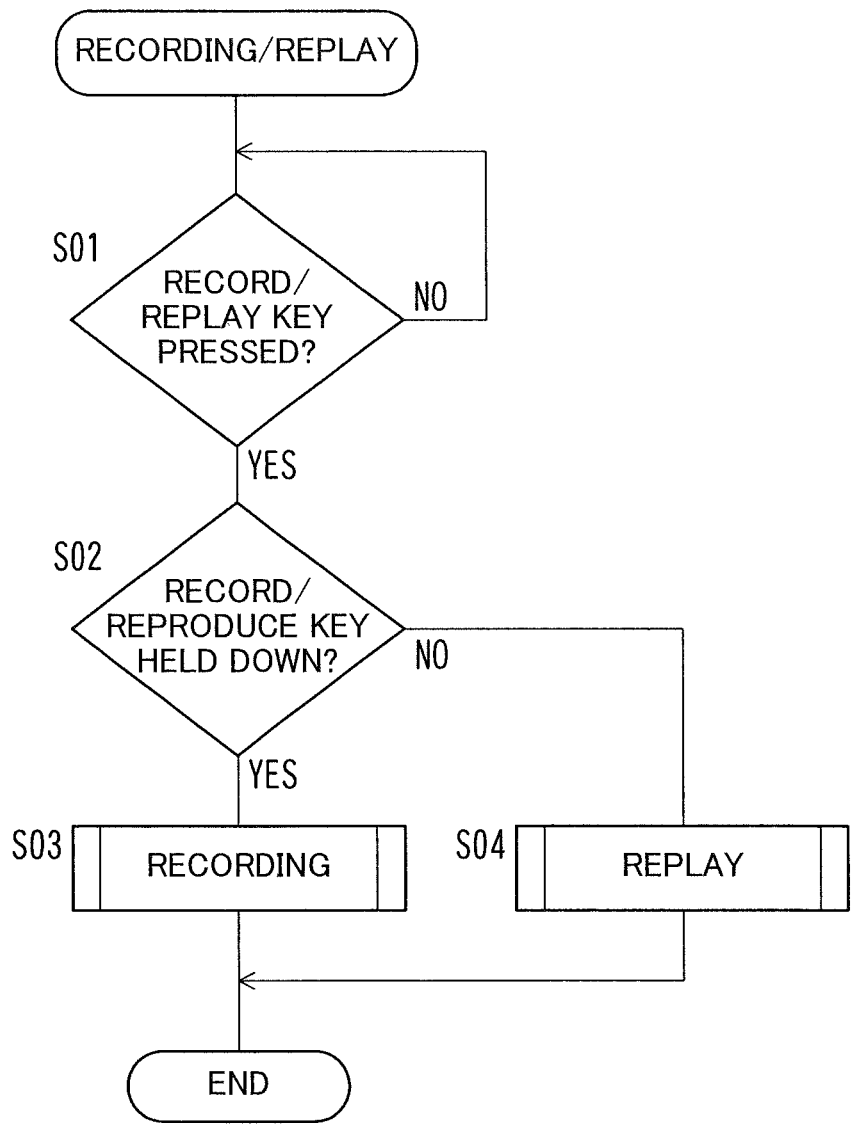
FIG. 4 is a flowchart depicting the flow of recording/replay processing.

The record/replay key 35 is used to designate the recording mode or the replay mode. As depicted in the flowchart of FIG. 4, in response to the record/replay key 35 held down (YES in Step S01, and YES in Step S02), the CPU 24 sets the recording mode to execute a recording routine (Step S03). If the record/replay key 35 is pressed but not held down (YES in Step S01, and NO in Step S02), then the CPU 24 sets the replay mode to execute a replay routine (S04).

Figure 5:
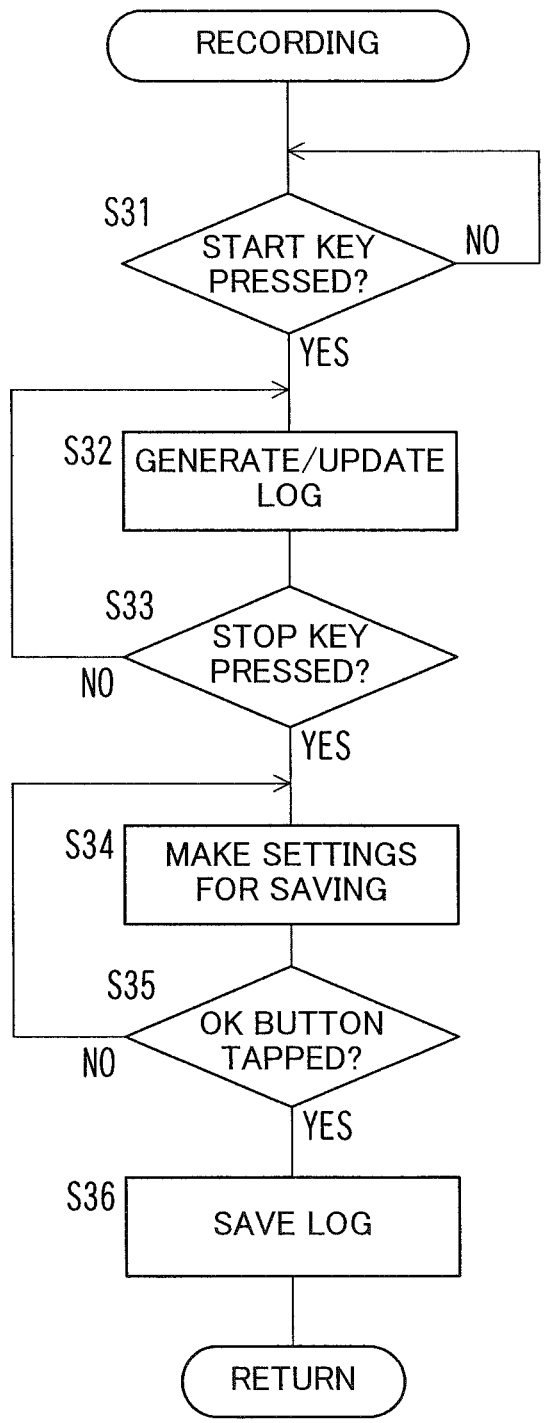
FIG. 5 is a flowchart depicting the flow of a recording routine.

FIG. 5 is a flowchart depicting the flow of the recording routine of FIG. 4.

The CPU 24 checks repeatedly whether or not the start key 31 is pressed until the start key 31 is pressed physically (Step S31). When the start key 31 has been pressed physically (YES in Step S31), the CPU 24 records, as a log record, event information on operation which is performed through the operating panel 20 and is inputted from the input control portion 27 (Step S32). The event information includes information on the type of operation and information for identifying the time at which the operation has been made. Until the stop key 32 is pressed physically (NO in Step S33), the CPU 24 adds a record in response to the receipt of information on the occurrence of operation from the input control portion 27, so that the log is updated.

When the stop key 32 is pressed physically (YES in Step S33), the CPU 24 makes settings for saving the log (Step S34). In Step S34, the CPU 24 displays a screen 44 shown in FIG. 6. The screen 44 is displayed in order for the user to designate the name of saved data and destination to save the data.

Figure 6:
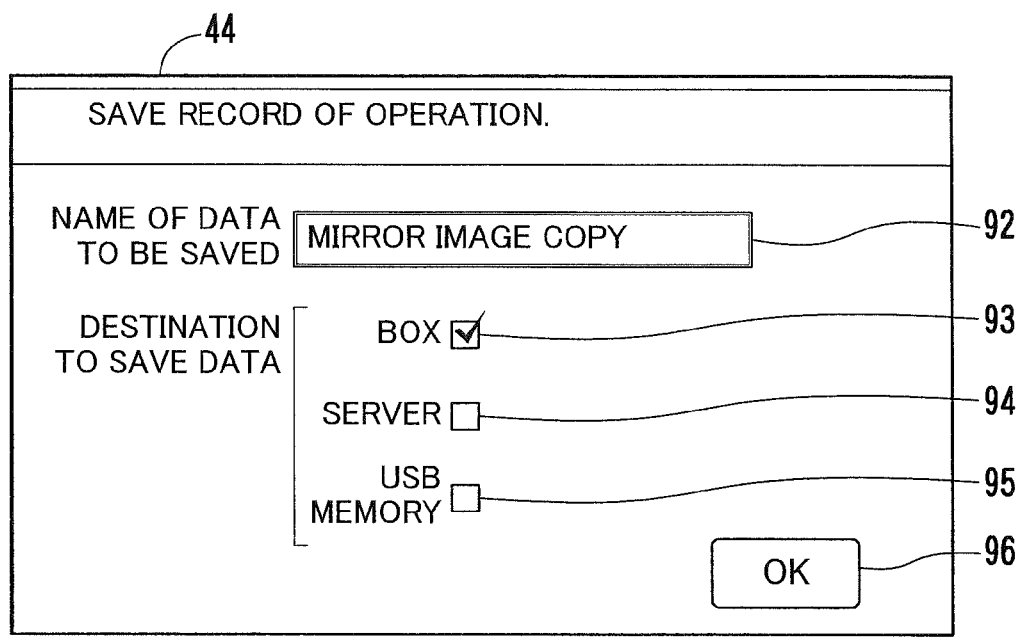
FIG. 6 is a diagram showing an example of an entry screen used to save a log.

Referring to FIG. 6, the screen 44 has an entry area 92 into which the name of saved data is entered, check boxes 93, 94, and 95 corresponding to options for destination to save the data, and an OK button 96 to set the designation. When the screen 44 is displayed, a name automatically given based on the date/time and a user ID is displayed in the entry area 92. The user can designate a desired name instead of the name automatically given. In response to the entry area 92 tapped by the user, a software keyboard is displayed as a pop-up below the entry area 92, which allows the user to enter any character. In the illustrated example, "mirror image copy" is entered as the name of saved data.

The options for destination to save the data are the box in the storage 16 of the MFP 1, the server 2 external to the MFP 1, and the removable memory 3 attached to the MFP 1. The user taps onto the check box 93, 94, or 95 corresponding to the desired option to select a destination to save the data. The check box 93, 94, or 95 selected has a check mark. In FIG. 6, the check box 93 is checked, and the box is designated as a destination to save the data. Any one, two or all of the three options may be designated as the destination to save the data. In the case where no removable memory 3 is attached to the MFP 1, the options are the box and the server 2.

Referring back to FIG. 5, in response to the OK button 96 tapped in the screen 44 (YES in Step S35), the CPU 24 performs processing for saving the log obtained in Step S32 (Step S36). To be specific, the CPU 24 requests the main controller 10 to store the log into the box (storage 16), the server 2, or the removable memory 3 which has been designated as the destination in the screen 44 by the user. As requested, the log is transferred to the destination and saved thereto by the main controller 10.

The log saved in the foregoing manner is replayed at any time. A user who gives a command to replay the log (called "user B" herein) is usually a different person from the user performing an operation which is recorded as the log (called "user A" herein). For example, the user B who is not familiar with the operation on the MFP 1 replays the log for the purpose of learning the steps of the recorded operation. It is also possible that the user A replays the log.

The function to replay a log in the MFP 1 of this embodiment has a first mode in which the log is replayed after being modified as necessary, and a second mode in which the log is replayed as is. When giving a command to replay the log, the user may select the first mode or the second mode.

The modification to the log in the first mode is to delete, from records making up the log, a record of a scroll operation corresponding to specific conditions. Deletion of a part of the records shortens the time required to replay the log.

The first mode is further described by taking a concrete example of the operating screen.

Figure 7:
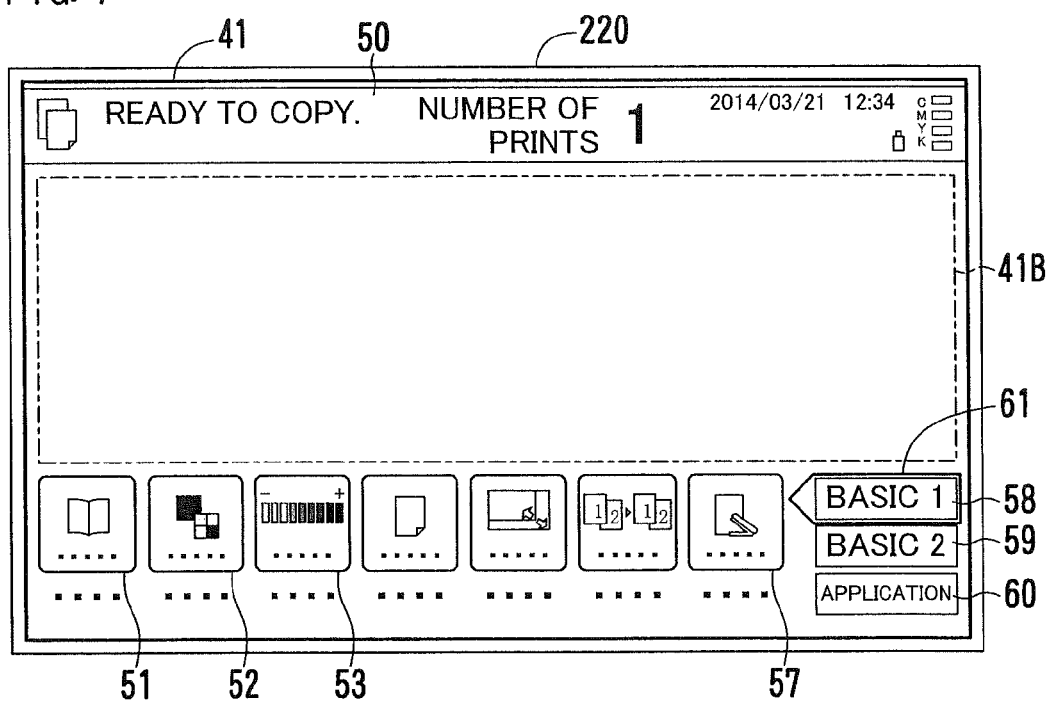
FIG. 7 is a diagram showing an example of a screen related to an operation to be recorded.

FIG. 7 shows a screen 41 which is an initial screen used to make settings for operation related to the copy function.

The screen 41 has, on its upper end, a message area 50 for informing that the MFP 1 is ready to perform copy operation. The screen 41 has, on its lower end, seven buttons for selecting functions, e.g., buttons 51, 52, 53, and 57. The seven buttons are provided in the form of a horizontal line. On the right of the seven buttons, buttons 58, 59, and 60 for selecting function groups are provided vertically. A region 41B is provided between the message area 50 and the button row. When any one of the seven buttons for selecting functions is tapped onto, a window pops up in the region 41B to prompt the user to make detailed settings for a function corresponding to the button tapped.

The seven buttons for selecting functions correspond to functions of a first basic group among many functions of the MFP 1. In order to indicate this, a frame-like cursor 61 enclosing the button 58 corresponding to the first basic group is displayed in the screen 41.

In response to the button 59 tapped in the screen 41, the screen 41 is replaced with a screen having buttons for selecting functions corresponding to a second basic group. Such a screen has a layout similar to that of the screen 41. No image is scrolled through both in the screen 41 corresponding to the first basic group and in the unillustrated screen corresponding to the second basic group. In contrast, an image is scrolled through in a screen displayed in response to the button 60 tapped in the screen 41.

Figure 8:
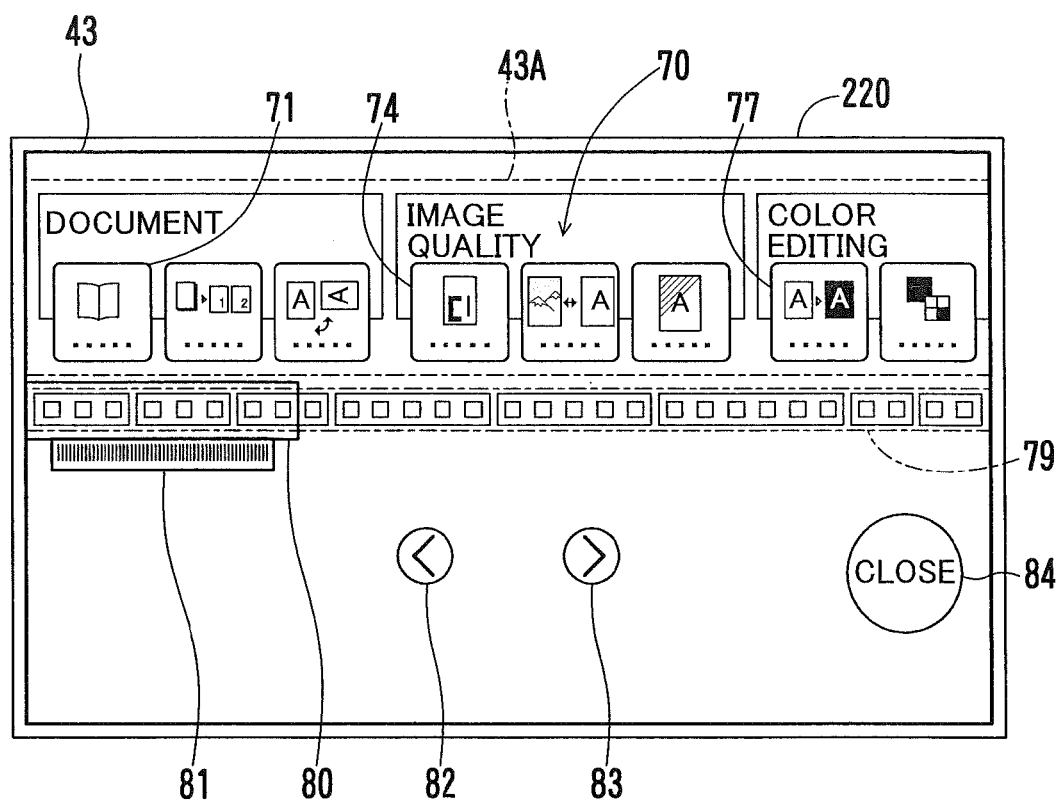
FIG. 8 is a diagram showing an example of a screen related to an operation to be recorded.

In response to the button 60 tapped in the screen 41 of FIG. 7, the screen 41 is replaced with a screen 43 as shown in FIG. 8. The screen 43 has a scroll region 43A on its upper half. In the scroll region 43A, a row of buttons for selecting functions, e.g., buttons 71, 74, and 77, are scrolled through to move from side to side with respect to a display surface 220. Consequently, the row of buttons provided in the form of a horizontal line appears on the display surface little by little. The number of buttons displayed at one time is about 8 as shown in FIG. 8.

An operation for the user to give a command to scroll the displayed contents, namely, a scroll operation, is received in the screen 43. Examples of the scroll operation are: flick or drag made at any position in the scroll region 43A extending horizontally along the length of the screen 43; flick or drag made on a slider 81; and a tap onto a scroll button 82 or 83.

Figure 9:
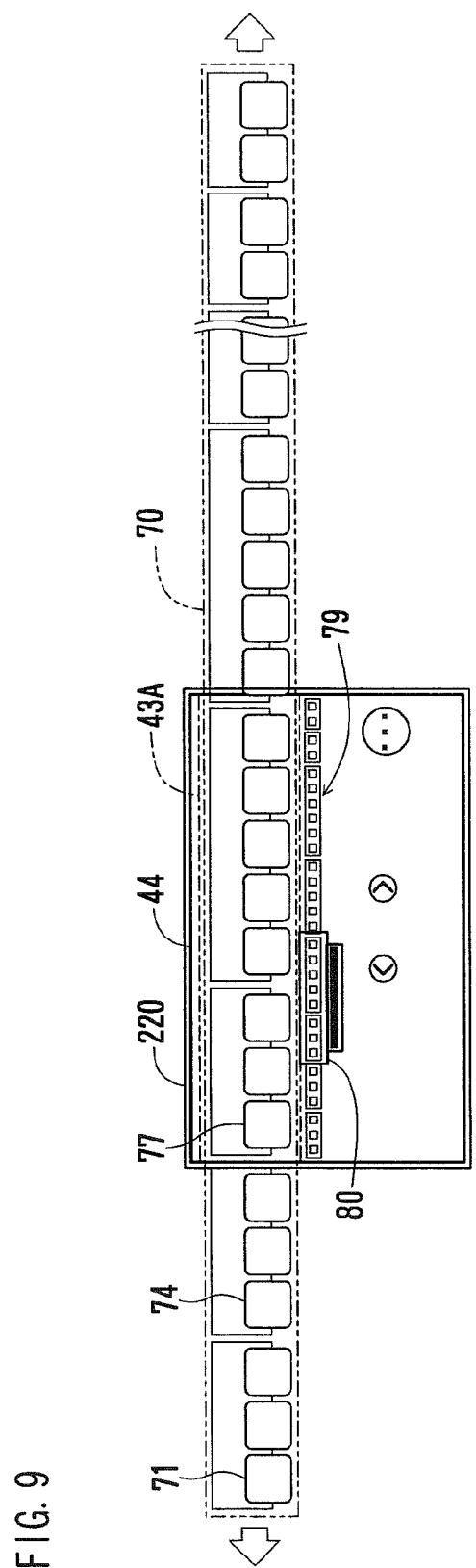
FIG. 9 is a schematic diagram showing an example of a button row scrolled across.

The slider 81 is a movable button accompanied with a cursor 80 on a scale 79 below the scroll region 43A. The scale 79 is a mark representing the simplified entire button row 70 (see FIG. 9) to be scrolled through. The cursor 80 is a mark representing a part of the button row 70 appearing on the screen 43.

In a state where the button row 70 is not positioned at the movement end thereof, the button row 70 moves in accordance with the scroll operation. For example, in accordance with flick to the left made in the scroll region 43A, the button row 70 moves to the left. Likewise, in accordance with flick to the right made therein, the button row 70 moves to the right. In accordance with the slider 81 flicked to the left, the button row 70 moves to the right. Likewise, in accordance with the slider 81 flicked to the right, the button row 70 moves to the left.

In response to a button 84 tapped in the screen 43, the screen 43 is replaced with the screen 41 of FIG. 7.

Figure 10:
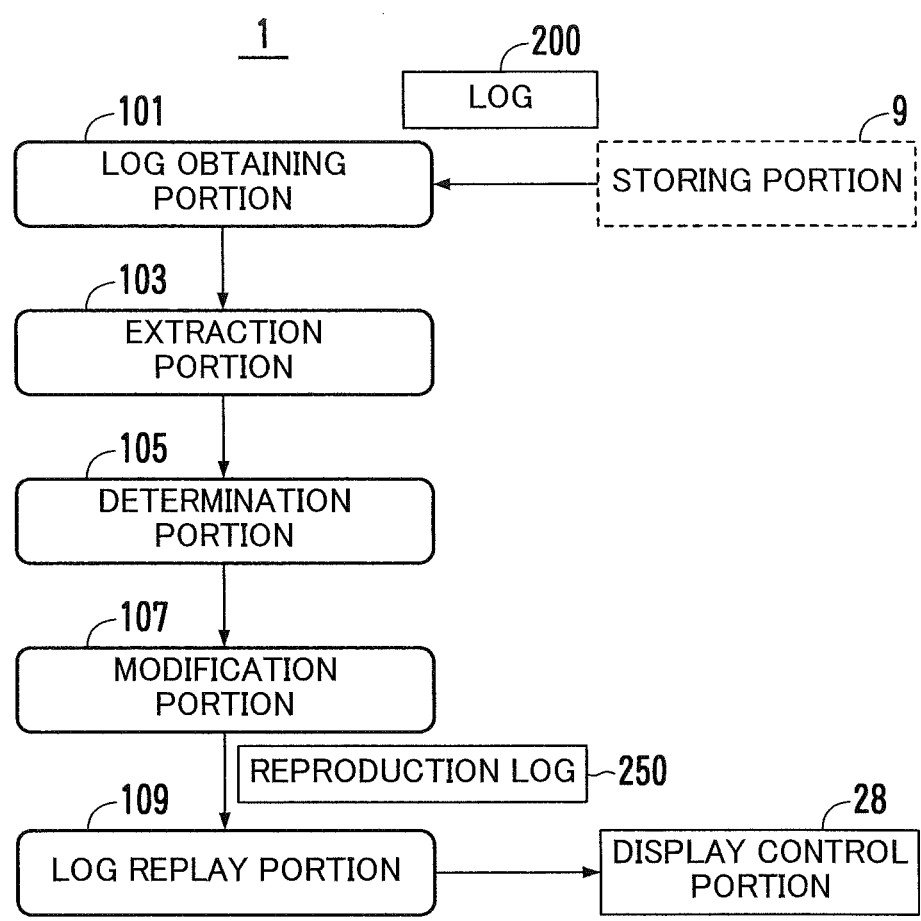
FIG. 10 is a diagram showing an example of the functional configuration of a main part of an MFP.

FIG. 10 shows an example of the functional configuration of the main part of the MFP 1 acting as a screen display device for replaying a saved log.

The MFP 1 is configured of a log obtaining portion 101, an extraction portion 103, a determination portion 105, a modification portion 107, a log replay portion 109, and so on. These portions are functional elements implemented in response to execution of programs stored in the ROM 25 by the CPU 11.

The log obtaining portion 101 obtains, from the storing portion 9, a log 200 saved thereto. Herein, the storing portion 9 is a general term for the box of the storage 16, the server 2, and the removable memory 3, all of which are options for destination to save the log 200.

The extraction portion 103 serves to extract a first record and a second record from the log 200. The first record is a record corresponding to a scroll operation on a screen having the scroll region 43A, e.g., the screen 43. The second record is a record corresponding to an operation for selecting a button provided in the scroll region 43A. Such a selection operation is performed after the scroll operation on the screen corresponding to the first record.

The determination portion 105 determines whether or not the scroll operation shown in the first record is a "specific scroll operation". When a scroll operation is made more than once in a screen having the scroll region 43A, the determination portion 105 determines whether or not the scroll operation made more than once includes a specific scroll operation. The "specific scroll operation" herein is to scroll through the button row 70 in such a manner that the selected button moves from one side to the other side when viewed from an operation position of the display surface 220 shown in the second record. To be specific, in the case where the display surface 220 is virtually sectioned at the operation position into two regions adjacent along the scroll direction, a scroll operation of moving the button across the boundary (separator line) between the two regions is the specific scroll operation.

When the determination portion 105 determines that the scroll operation made more than once includes the specific scroll operation, the modification portion 107 generates a reproduction log 250 by modifying the log 200 to shorten a reproduction time for displaying screens corresponding to the specific scroll operation and the subsequent operation. The log replay portion 109 lets the MFP 1 to display a screen in accordance with the reproduction log 250.

FIG. 11 shows an example of items of the log 200. The record of the log 200 includes data on items such as a number 201 of the record, a screen ID/scroll state 202, an elapsed time 203, an operation type 204, and other attributes 205. A record of the reproduction log 250 has data formation similar to that of the log 200.

Figure 12:
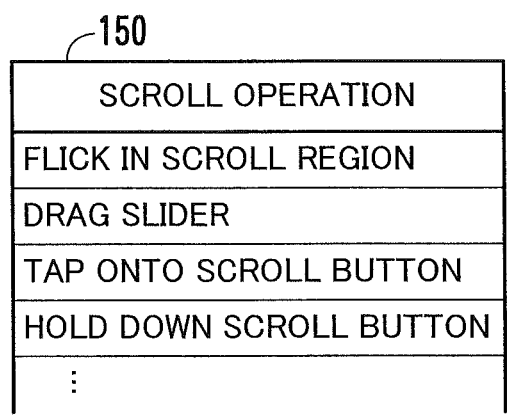
FIG. 12 is a diagram showing an example of definition information on scroll operation.

FIG. 12 shows an example of definition information on scroll operation. The ROM 25 stores therein a table 150 in which an operation to be detected as the scroll operation is defined. In this example, what is defined as the scroll operation are: flick in the scroll region 43A; dragging the slider 81; tap onto the scroll button 82 or 83; and holding down the scroll button 82 or 83.

Figure 13:
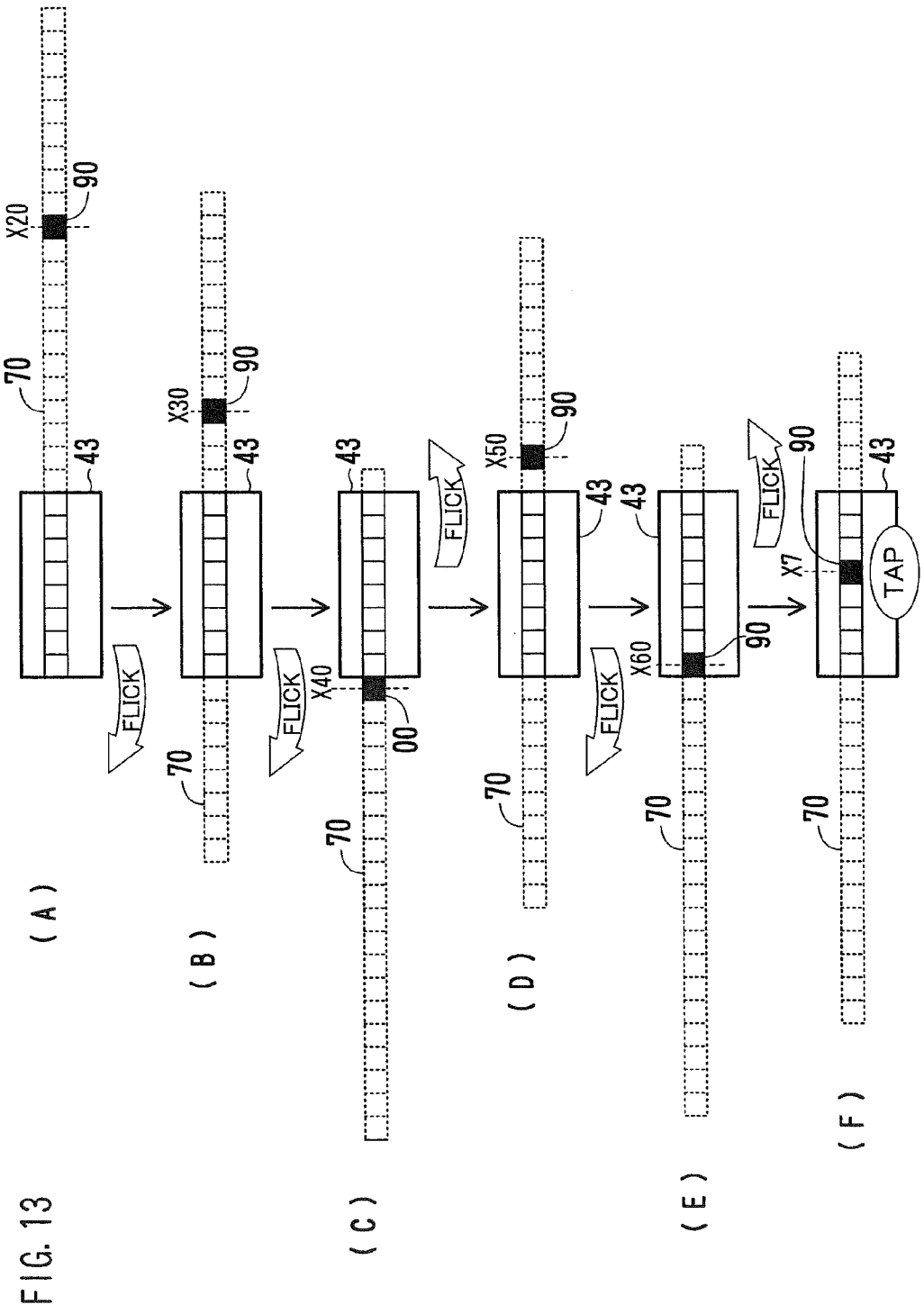
FIG. 13 is a schematic diagram showing an example of a series of recorded operations.

FIG. 13 schematically shows an example of a series of recorded operations shown in a log. In the illustrated example, flick is made at each step of (A)-(F), and tap is made onto the button 90 at step of (F). Assume that the button 90 is used to select a mirror image copy function. The mirror image copy function is to print a document image with the image flipped horizontally.

At the step of (A), the screen 43 does not include the button 90. The button 90 is located on the right of the screen 43; therefore the button 90 is not displayed on the screen 43. Assume that the coordinate value of the button 90 in the scroll direction (the right-left direction) at this time is X20. Flick is made to display the button 90, so that the button row 70 moves to the left.

At the step of (B), the button 90 is moved to the left as compared with the step of (A). The button 90, however, is still on the right of the screen 43. Assume that the coordinate value of the button 90 at this time is X30. Flick is made to display the button 90, so that the button row 70 moves to the left.

At the step of (C), the button 90 is located on the left of the screen 43. As being outside the screen 43, the button 90 does not appear on the screen 43. Assume that the coordinate value of the button 90 at this time is X40. Flick is made to display the button 90, so that the button row 70 moves to the right.

At the step of (D), the button 90 is again located on the right of the screen 43. Assume that the coordinate value of the button 90 at this time is X50. Flick is made to display the button 90, so that the button row 70 moves to the left.

At the step of (E), the button 90 is located on the left end of the screen 43. Assume that the coordinate value of the button 90 at this time is X60. Flick is made to optimize the position of the button 90 while the button 90 is displayed on the screen 43. The flick moves the button row 70 a little to the right.

At the step of (F), the button 90 is located in the vicinity of the center of the screen 43 in the right-left direction. Assume that the coordinate value of the button 90 at this time is X7. The button 90 is tapped onto to select the mirror image copy function.

The series of operations include a scroll operation which ended up moving the button 90 more than necessary. The MFP 1 omits reproduction of screen display associated with the scroll operation which ended up moving the button 90 more than necessary.

Figure 14:
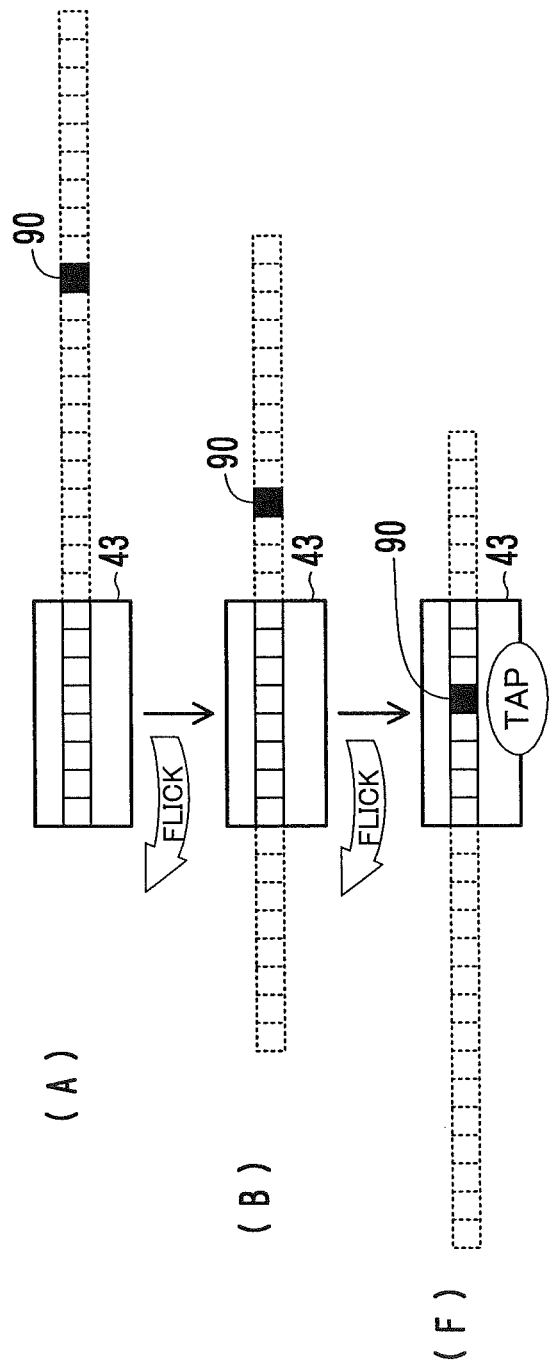
FIG. 14 is a schematic diagram showing an example of a series of operations to be reproduced.

FIG. 14 schematically shows an example of a series of operations to be reproduced. Referring to FIG. 14, the flick made at each of the steps (C)-(E) of FIG. 13 is omitted.

Figure 15:
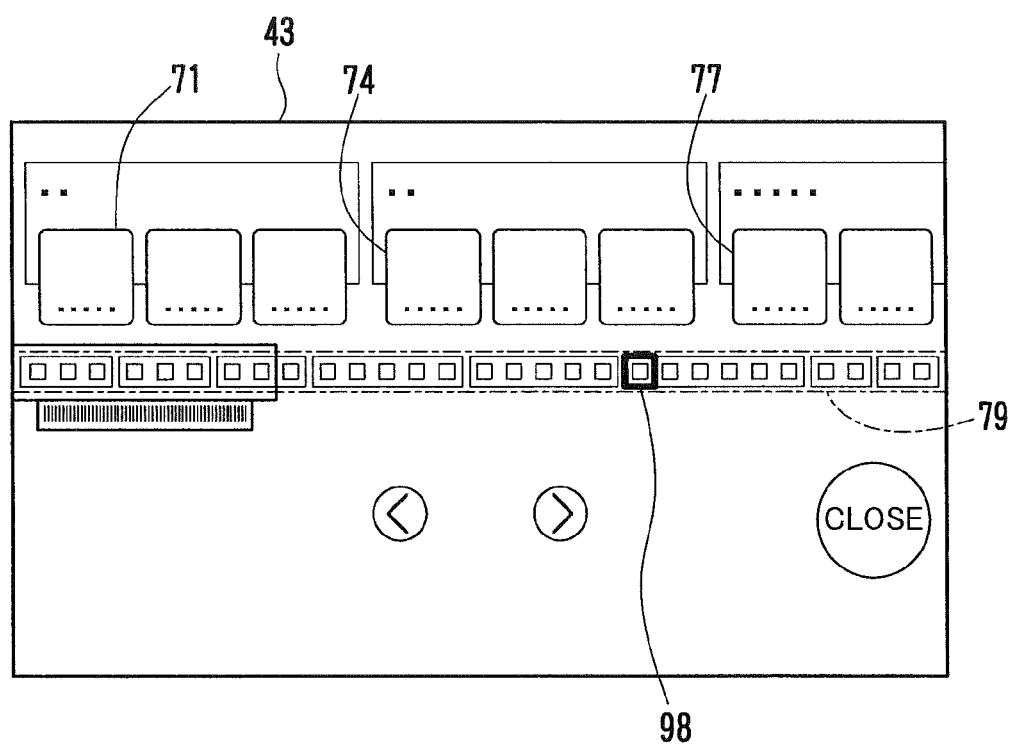
FIG. 15 is a diagram showing an example as to how to add a mark in reproducing displayed contents.
Figure 16:
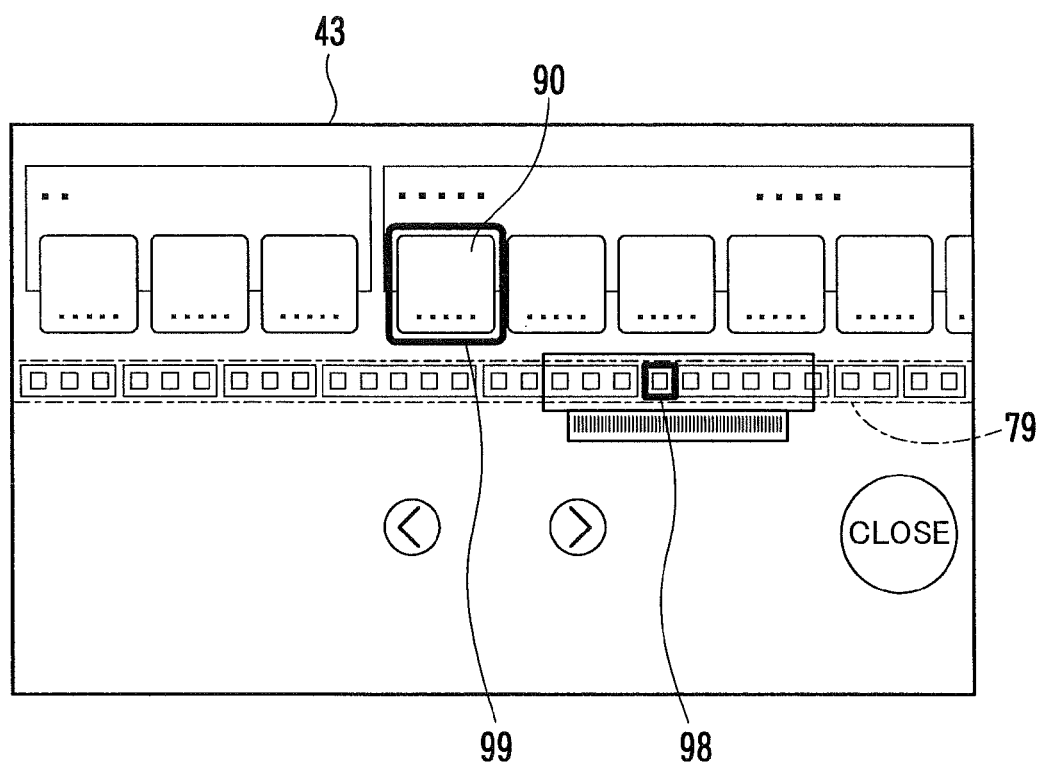
FIG. 16 is a diagram showing an example as to how to add a mark in reproducing displayed contents.

FIGS. 15 and 16 show an example as to how to add a mark in reproducing displayed contents. In reproducing the displayed contents based on the reproduction log 250, marks 98 and 99 are added to the screen 43. The marks 98 and 99 are to make the button 90, which is to be tapped, stand out before the button 90 is tapped.

In a stage where the button 90 is not displayed as shown in FIG. 15, the mark 98 is added. The mark 98 has a frame-like shape to surround a quadrangle corresponding to the button 90 in the scale 79. This enables the user to expect early that a touch action is made later onto the button 90.

In a stage where the button 90 is displayed in the screen 43 as shown in FIG. 16, the mark 98 and the mark 99 are added. The mark 99 has a frame-like shape to surround the button 90 itself. This enables the user to certainly know that a button onto which a touch action is to be made is the button 90 before such a touch action is made onto the button 90.

FIG. 17 shows an example of a saved log, and an example of a reproduction log. In FIG. 17, for the sake of convenience, the number of a record of the log 200 is represented by a character string in which alphabet "A" and a number are combined together. The number of a record of the reproduction log 250 is represented by a character string in which alphabet "B" and a number are combined together.

The log 200 shown in (A) of FIG. 17 corresponds to the following series of operations: switching display from the screen 41 to the screen 43; flicking in the screen 43 more than once to display the button 90; tapping onto the button 90 to select the mirror image copy function; making settings for a mirror image copy; and pressing the start key 31 to make a mirror image copy.

In the log 200, a record for number A1 shows that a position of coordinates (X1, Y1) has been tapped in the screen 41 having a screen ID "initial" at a time point when 2 seconds have elapsed since making a record of operation was started. A record for number A2 shows that flick has been made in the screen 43 having a screen ID "application" in a scrolled state where the coordinate value of the reference position (left end, for example) of the button row 70 is Xa at a time point when 4 seconds have elapsed since making a record of operation was started. A record for each of numbers A3-A6 also shows that flick has been made in the screen 43. A record for number A7 shows that a position of coordinates (X7, Y7) has been tapped in the screen 43 at a time point when 12 seconds have elapsed since making a record of operation was started. A record for number A12 shows that the start key 31 has been pressed in a state where a screen having a screen ID "mirror image" is displayed at a time point when 18 seconds have elapsed since making a record of operation was started.

On the other hand, the reproduction log 250 shown in (B) of FIG. 17 corresponds to the log 200 without the records for numbers A4, A5, and A6. The records for numbers B1-B4 and B9 of the reproduction log 250 correspond to the records for numbers A1-A3, A7, and A12 of the log 200, respectively.

It should be noted that, in the case of creating the reproduction log 250, elapsed time is modified in line with the omission of the records. To be specific, the record for number A7 of the log 200 shows that the elapsed time is 12 seconds, and the record for number B4 corresponding to number A7 shows that the elapsed time is 7 seconds. Likewise, the record for number A12 of the log 200 shows that the elapsed time is 18 seconds, and the record for number B9 corresponding to number A12 shows that the elapsed time is 13 seconds.

For the modification to the elapsed time, for example, the following algorithm is applicable. To be specific, a difference in elapsed time between a record to be omitted and the immediately preceding record is calculated. The difference is added to the elapsed time for the immediately preceding record. The resulting value is then used as an elapsed time for the immediately following record after the omitted record. The specific example is provided with reference to FIG. 17. A difference (2 seconds) between the elapsed time (7 seconds) for the record (A4) to be omitted and the elapsed time (5 seconds) for the immediately preceding record (A3) is calculated. The difference (2 seconds) is added to the elapsed time (5 seconds) for the immediately preceding record (A3) to obtain the value of 7 seconds. The obtained value (7 seconds) is then used as the elapsed time (7 seconds) for the immediately following record (B4) after the omitted record.

Figure 18:
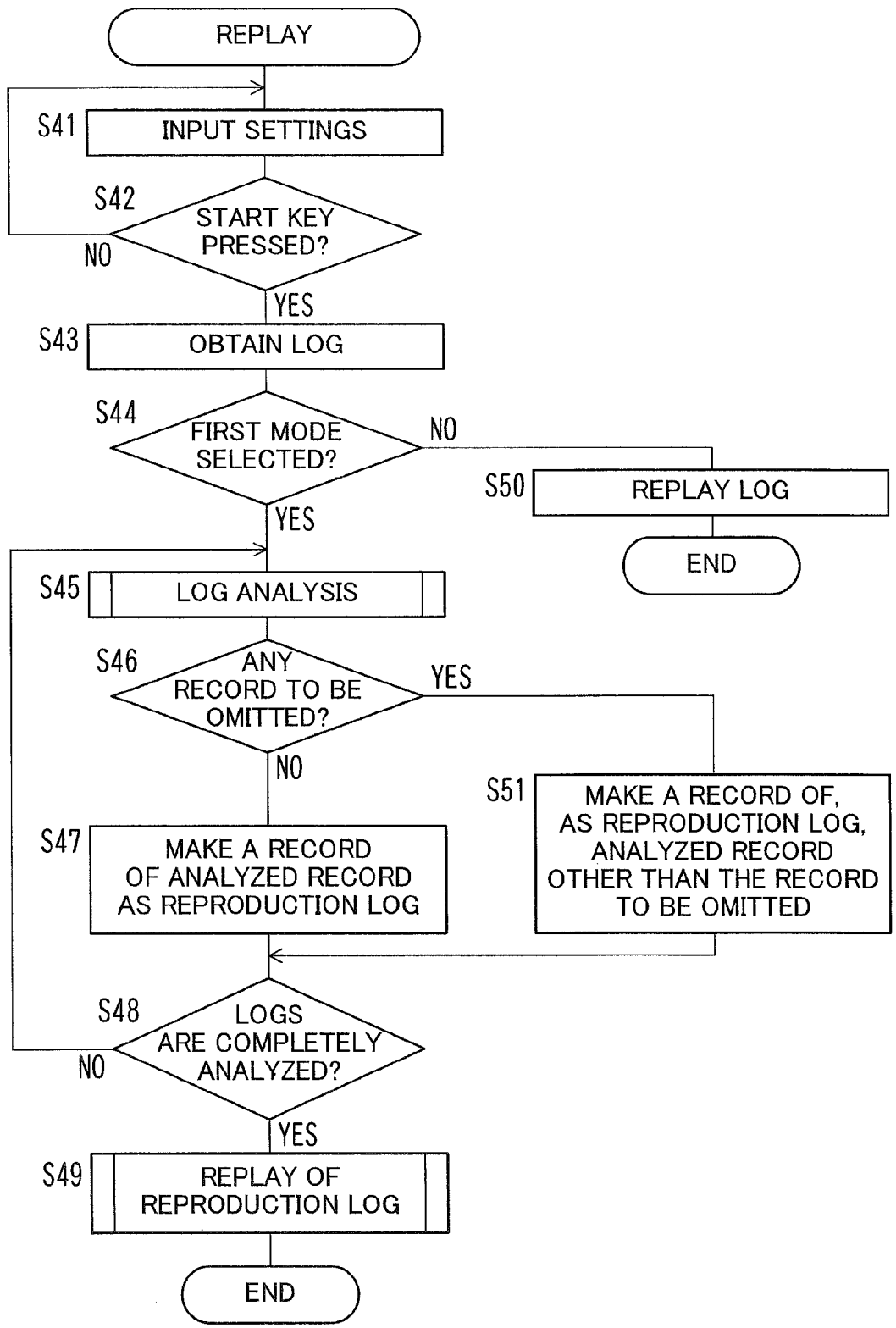
FIG. 18 is a flowchart depicting the flow of the replay routine of FIG. 4.

FIG. 18 is a flowchart depicting the flow of the replay routine of FIG. 4.

As described above, the replay routine is executed by the CPU 24 in response to the record/replay key 35 pressed.

Figure 20:
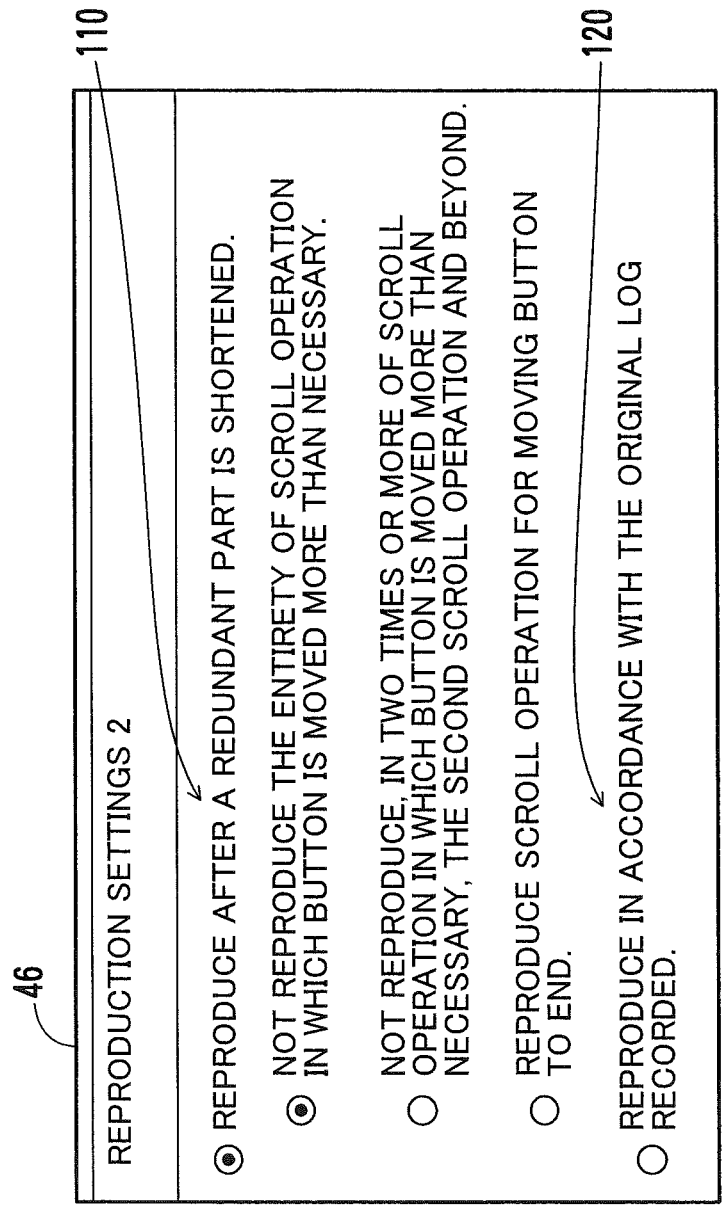
FIG. 20 is a diagram showing an example of a screen used to make settings related to replay of a log.

The CPU 24 performs settings input processing for displaying, in order, the screens 45 and 46 shown in FIGS. 19 and 20 respectively (Step S41). The screen 45 of FIG. 19 is used for the user to designate a log to be replayed. In the screen 45, a list 97 of one or more logs saved to the storing portion 9 is displayed. The user can select the log 200 to be replayed by tapping onto a row corresponding to the desired log 200 of the list 97. In FIG. 19, a log 200 named "mirror image copy" saved to the box is selected. When the OK button 96 is tapped on the screen 45, the screen 45 is replaced with the screen 46.

The screen 46 is used for the user to select the replay mode. The screen 46 has radio buttons, associated with a first mode and a second mode, showing brief explanations 110 and 120 for the respective modes. The first mode is to replay the log after the log is modified as necessary. The second mode is to replay the log without modifying the log. In the first mode, three sub modes are prepared to select a method for modifying the log. The first sub-mode (mode 1) is not to reproduce the entirety of the specific scroll operation. The second sub-mode (mode 2) is not to reproduce, in the specific scroll operation performed twice or more, the second specific scroll operation and beyond. The third sub-mode (mode 3) is to reproduce a scroll operation for moving a scroll target and returning the same.

Referring back to FIG. 18, the CPU 24 checks whether or not the start key 31 has been pressed with the screen 46 displayed (Step S42). In response to the start key 31 pressed (YES in Step S42), the CPU 24 obtains the log 200 from the storing portion 9 (Step S43).

The CPU 24 then checks whether or not the first mode is selected (Step S44). When the first mode is not selected, in other words, when the second mode is selected (NO in Step S44), the CPU 24 replays the log 200 as-is.

When the first mode is selected (YES in Step S44), the CPU 45 executes processing for log analysis (Step S45). If the analysis result shows that there is no record to be omitted, i.e., no record determined to be "replay unnecessary" (NO in Step S46), then the CPU 24 records the analyzed record as a record for the reproduction log 250 (Step S47). On the other hand, if the analysis result shows that there is a record to be omitted (YES in Step S46), then the CPU 24 records, as a record for the reproduction log 250, the analyzed record other than the record to be omitted (Step S51).

After that, the process returns to Step S45 to analyze the log 200 until all the records of the log 200 are completely analyzed. If all the records are completely analyzed (YES in Step S48), then the CPU 24 replays the reproduction log 250 obtained in Step S47 or Step S51.

It is not always necessary to replay the reproduction log 250 until all the records of the log 200 are completely analyzed. Another arrangement is possible in which, after some records of the log 200 are analyzed, replay of the reproduction log 250 obtained thus far is started, and the reproduction log 250 is replayed in parallel with analysis of the remaining records of the log 200.

Figure 21:
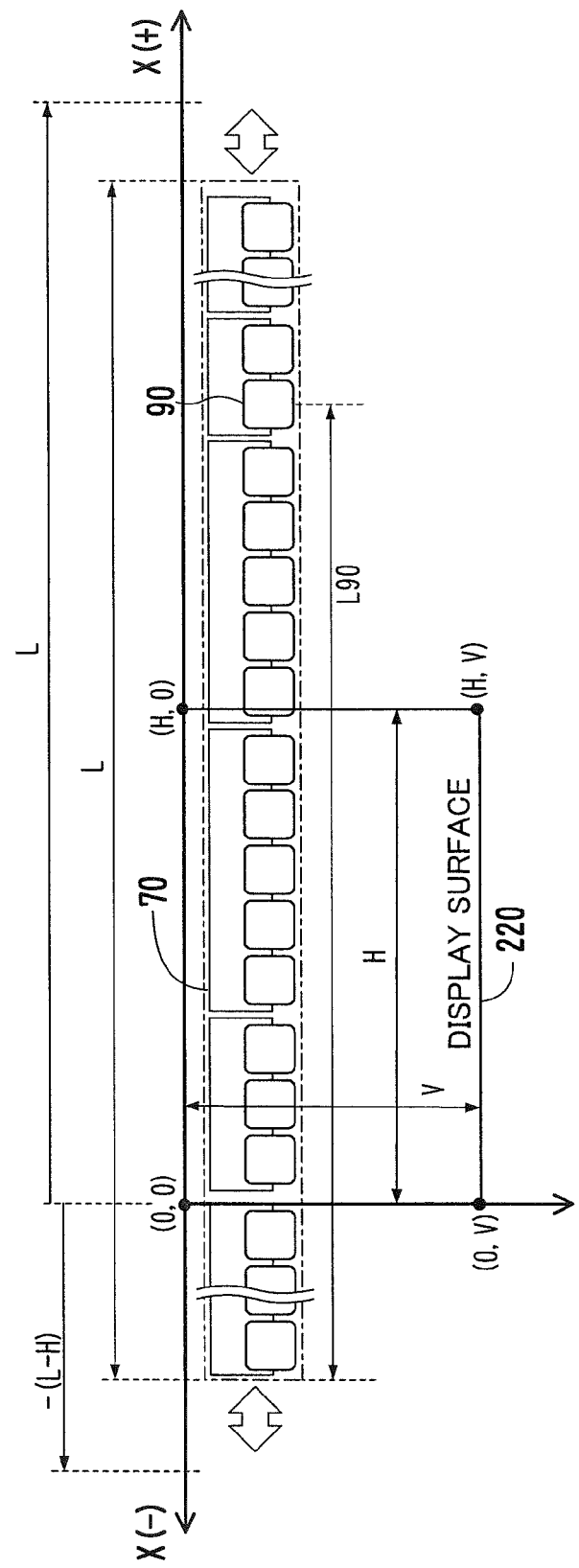
FIG. 21 is a diagram showing an example of settings for coordinate axes.

FIG. 21 shows an example of settings for coordinate axes. An orthogonal coordinates system is assumed which has the origin set at the upper left corner of the display surface 220 of the touch panel display 22, an X-axis extending to the direction from the origin to the right corresponding to a positive direction, and a Y-axis extending to the direction from the origin to down corresponding to a positive direction. Where the length of the display surface 220 in the X-direction is denoted by "H", and the length thereof in the Y-direction is denoted by "V", the coordinates at the lower left corner, lower right corner, and upper right corner of the display surface 220 are represented by (0, V), (H, V), and (H, 0), respectively.

Let "L" denote the length of the button row 70, which is a scroll target image, in the X-direction. The button row 70 is set to be movable between a position for which the X-coordinate value is −(L-H) and a position for which the X-coordinate value is L. When the button row 70 is scrolled through, the position of the button row 70 in the display surface 220 is calculated to generate a raster image for animation. The position of the button 90 in the display surface 220 can be specified based on the position of the button row 70 and a position of the button 90 in the button row 70. In this way, it is possible to specify, as the position of the button 90, a position which is L90 distant away from the left end of the button row 70.

FIG. 22 shows an example of the relationship between a touched location on the button 90 and a coordinate value of the button 90. In response to the button 90 tapped, coordinates (X7, Y7) of the touched location P90 are recorded in the log 200 as shown in FIG. 17. As discussed above, the X coordinate values (X20, X30, X40, and so on) of the button 90 in the step of moving to the X-direction as the scroll direction M1, in response to flick, correspond to a geometric barycenter 90G of the button 90.

According to the log analysis in Step S45 of FIG. 18, a comparison is made between the X-coordinate value of the button 90 immediately after flick is made each, time and the X-coordinate value of the touched location P90. Through the comparison, it is determined whether or not the flick corresponds to the specific scroll operation.

Figure 23:
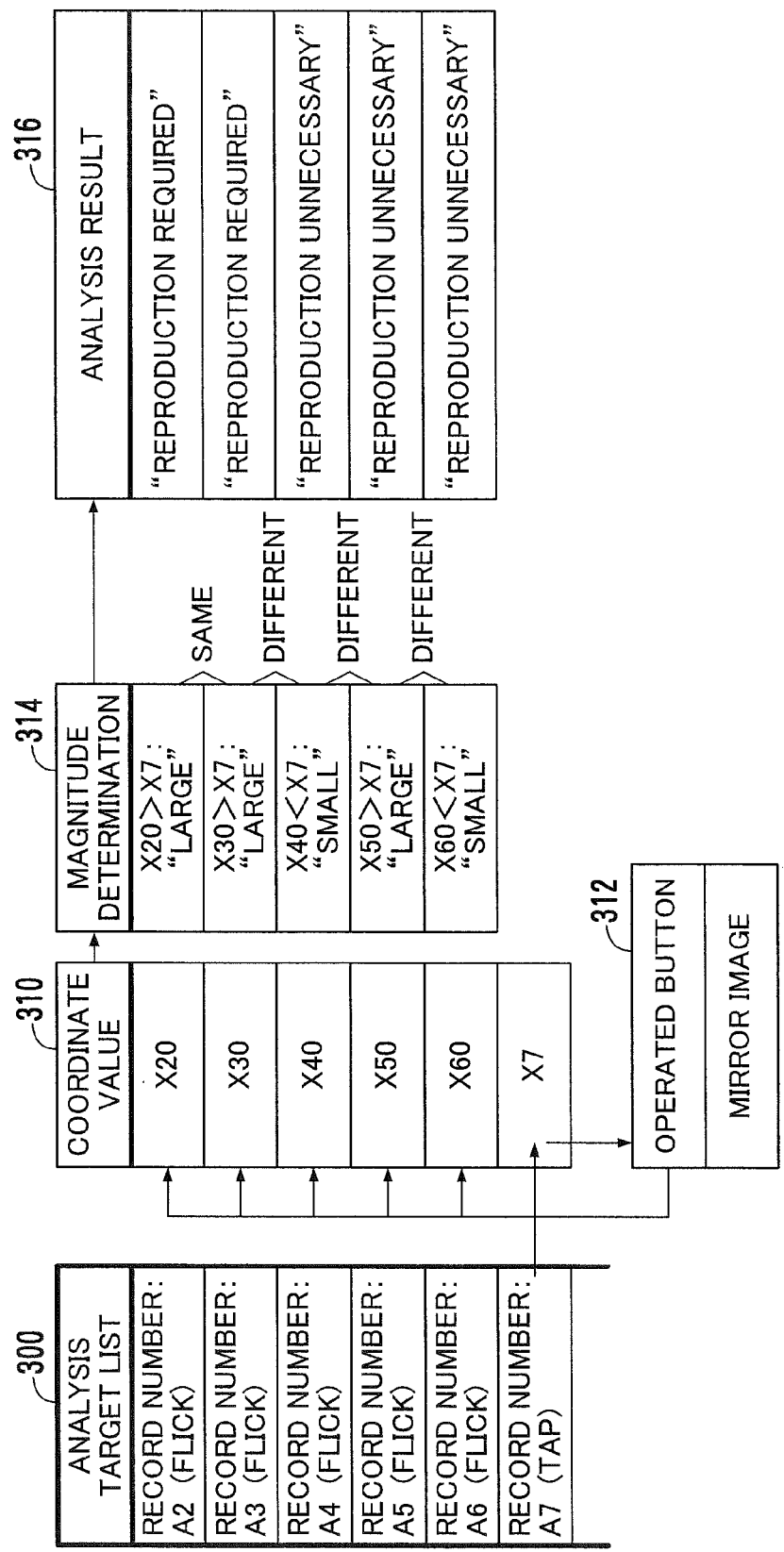
FIG. 23 is a diagram showing an example of a target list used to analyze a log and a register.
Figure 24:
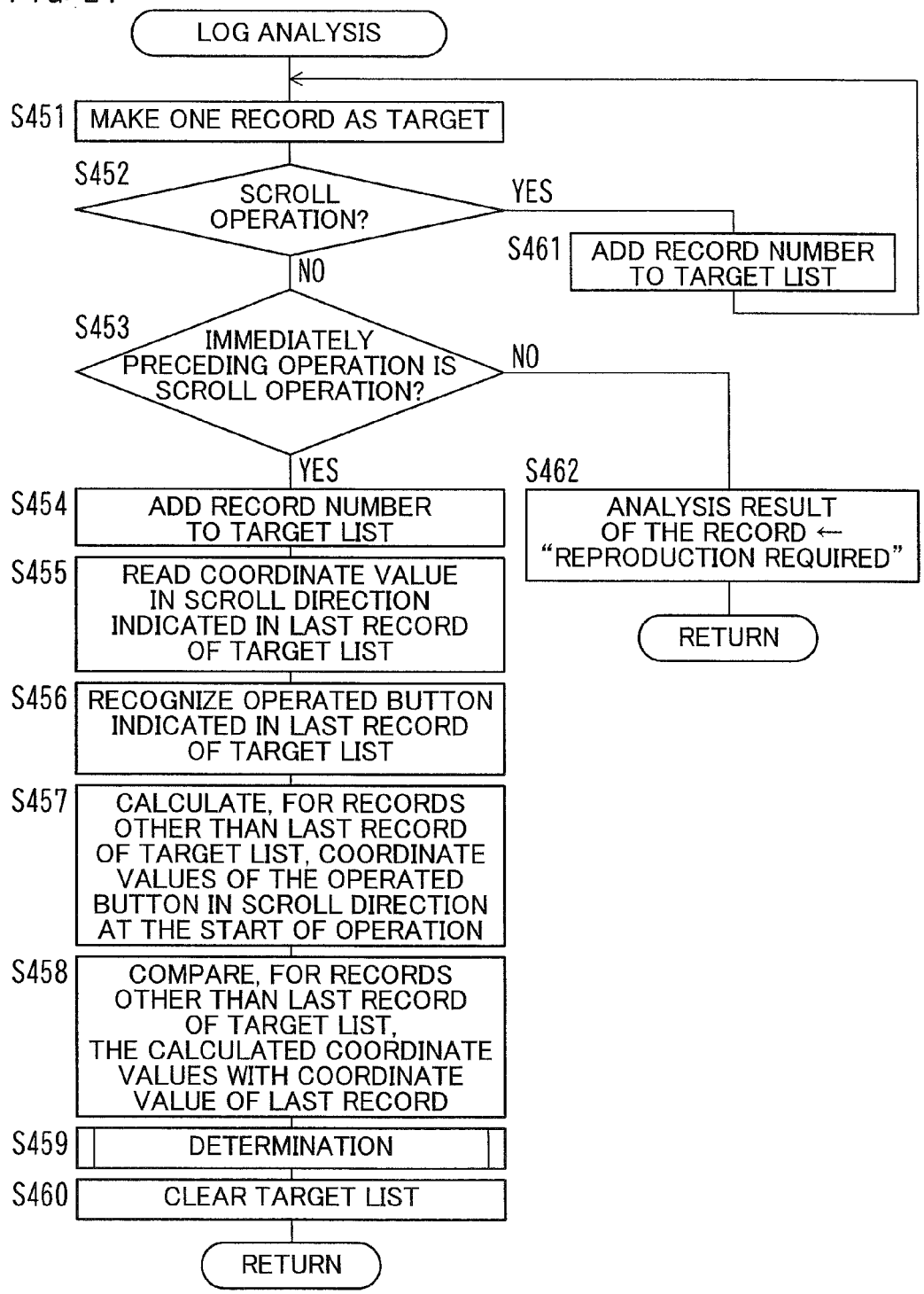
FIG. 24 is a flowchart depicting the flow of the log analysis routine of FIG. 18.

FIG. 23 shows an example of a target list used to analyze a log and a register. FIG. 24 is a flowchart depicting the flow of the log analysis routine. The steps of analyzing a log are described with reference to FIG. 23 and the flowchart of FIG. 24.

Referring to FIG. 24, the CPU 24 makes one record of the obtained log 200 as a target (Step S451). The record to be made as the target is a record given the youngest number among non-target records.

The CPU 24 checks, based on data on operation type of the target record, whether or not an operation indicated in the target record is a scroll operation defined in the table 150 of FIG. 12 (Step S452). If the operation indicated in the target record is the scroll operation (YES in Step S452), then the number of the target record is added to the bottom of the target list 300 shown in FIG. 23 (Step S461). It is also possible to transcribe data on other items of the target record in addition to the number thereof from the log 200 to the target list 300

After the number of the target record is added to the target list 300, the flow returns to Step S451. Accordingly, if flick is made a plurality of times as shown in FIG. 13, the number of record corresponding to each flick is added to the target list 300.

If the operation for the target record is not the scroll operation (NO in Step S452), then it is checked whether or not an operation for the immediately preceding record of the target record is the scroll operation (Step S453). If the check result is negative, then the analysis result of the target record made as a target in Step S451 is determined to be "replay required" (Step S462). The flow then returns to the flow of FIG. 18.

If the check result in Step S453 is positive, then the CPU 24 adds the number of the target record to the bottom of the target list 300 (Step S454), and performs processing of Step S455 through Step S460 on records each of which the number is recorded in the target list 300.

Referring also to FIG. 23, the CPU 24 reads, from the log 200, the coordinate value (X7) in the scroll direction M1 indicated in the last record of the target list 300, and stores the coordinate value into a register 310 (Step S455). The CPU 24 then recognizes the operated button 90 indicated in the last record of the target list 300 (Step S456). At this time, the CPU 24 stores an ID (set as a "mirror image") of the recognized button 90 into a register 320.

The CPU 24 then calculates, for records other than the last record of the target list 300, namely, records corresponding to the scroll operation, coordinate values of the button 90 at the start of the operation (Step S457). The CPU 24 then compares the coordinate values calculated (X20, X30, X40, X50, and X60) with the coordinate value (X7) of the last record to determine the magnitude relationship therebetween (Step S458).

Based on the determination result of Step S458, the CPU 24 executes, for each of the records of the target list 300, a determination routine through which the analysis result is determined to be "replay required" or "replay unnecessary" (Step S459). After executing the determination routine, the CPU 24 clears the target list 300 and the registers 310, 312, 314, and 316. The flow then returns to the flow of FIG. 18.

Figure 25:
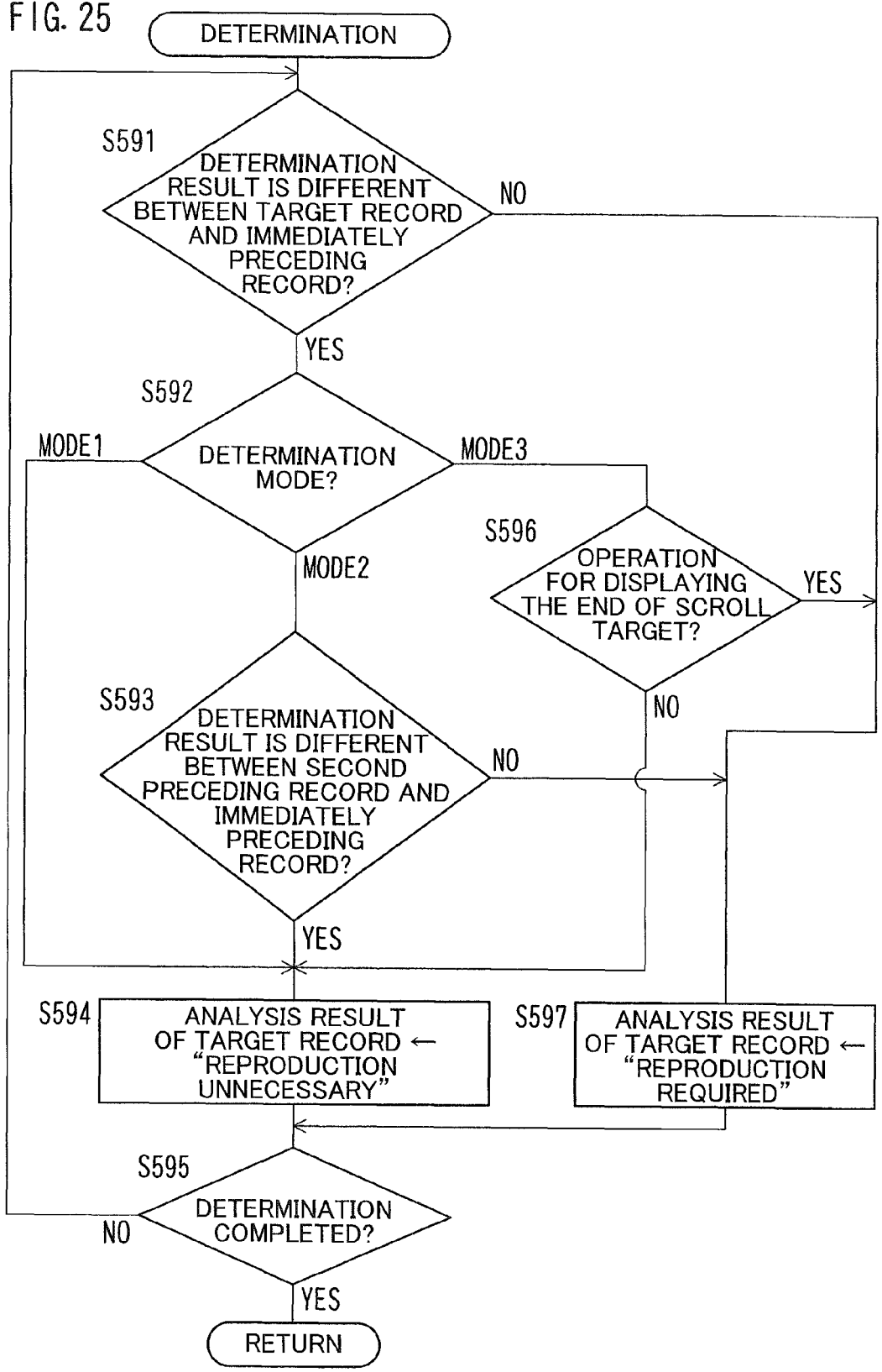
FIG. 25 is a flowchart depicting the flow of the determination routine of FIG. 24.

FIG. 25 is a flowchart depicting the flow of the determination routine of FIG. 24. For records which have not yet been regarded as targets in the target list 300, the CPU 24 makes records given younger numbers as targets, one by one, to perform the following processing on the target record.

Referring also to FIG. 23, the CPU 24 checks whether or not the determination result of the magnitude relationship in coordinate value is different between the target record and the immediately preceding record (Step S591). If the target record is the top record of the target list 300, in other words, if there is no immediately preceding record, then the check result is negative.

If the determination result is not different between the target record and the immediately preceding record (NO in Step S591), then the CPU 24 regards, as the analysis result for the target record, "replay required" (Step S597). Referring to the example of FIG. 23, the determination result of the magnitude relationship in coordinate value for, for example, the second record (A3) is "large". Further, the determination result of the magnitude relationship in coordinate value for the immediately preceding record (A2) is also "large". Since the determination result is not different between the two records, the analysis result for the second record (A3) is "replay required".

On the other hand, if the check result in Step S591 is positive, then to which way the CPU 24 pursues the process is determined depending on the mode designated in the screen 46 of FIG. 20 by the user.

When the mode 1 is designated in the screen 46, the CPU 24 determines that the analysis result of the target record is "replay unnecessary" (Step S594).

When the mode 2 is designated in the screen 46, the CPU 24 checks whether or not the determination result of the magnitude relationship in coordinate value is different between the second preceding record and the immediately preceding record (Step S593). If the check result in Step S593 is positive, then the CPU 24, which has determined that a specific scroll operation was performed successively, determines that the analysis result of the target record is "replay unnecessary" (Step S594). If the check result in Step S593 is negative, then the CPU 24, which has determined that a specific scroll operation was not performed successively, determines that the analysis result of the target record is "replay required" (Step S597).

When the mode 3 is designated, the CPU 24 checks whether or not an operation indicated in the target record is a scroll operation for moving the button row 70 to appear the end thereof (Step S596). If the check result in Step S596 is positive, then the CPU 24 determines that the analysis result of the target record is "replay required" (Step S597). If the check result in Step S596 is negative, then the CPU 24 determines that the analysis result of the target record is "replay unnecessary" (Step S594).

In the mode 3, the following situation is assumed: When a desired button is positioned at the end of the button row 70, a user whose operation is recorded performs intentionally a scroll operation of moving the button row 70 to the movement end at once, and moving back the button row 70 slightly to display the desired button. The end of the button row 70 is a part appearing on the screen when the button row 70 is moved to or around the movement end. For example, where the number of buttons displayed at one time is 8 or so, the end of the button row 70 is a part which extends from one end of the button row 70 to the length corresponding to the total length of approximately 8 buttons through 12 buttons. In order to reflect the user's intention in replaying the log, the analysis result is so determined not to omit the record of the scroll operation.

The processing from Step S591 through Step S597 is repeated until determination on all the records of the target list 300 is completely finished (YES in Step S595).

Figure 26:
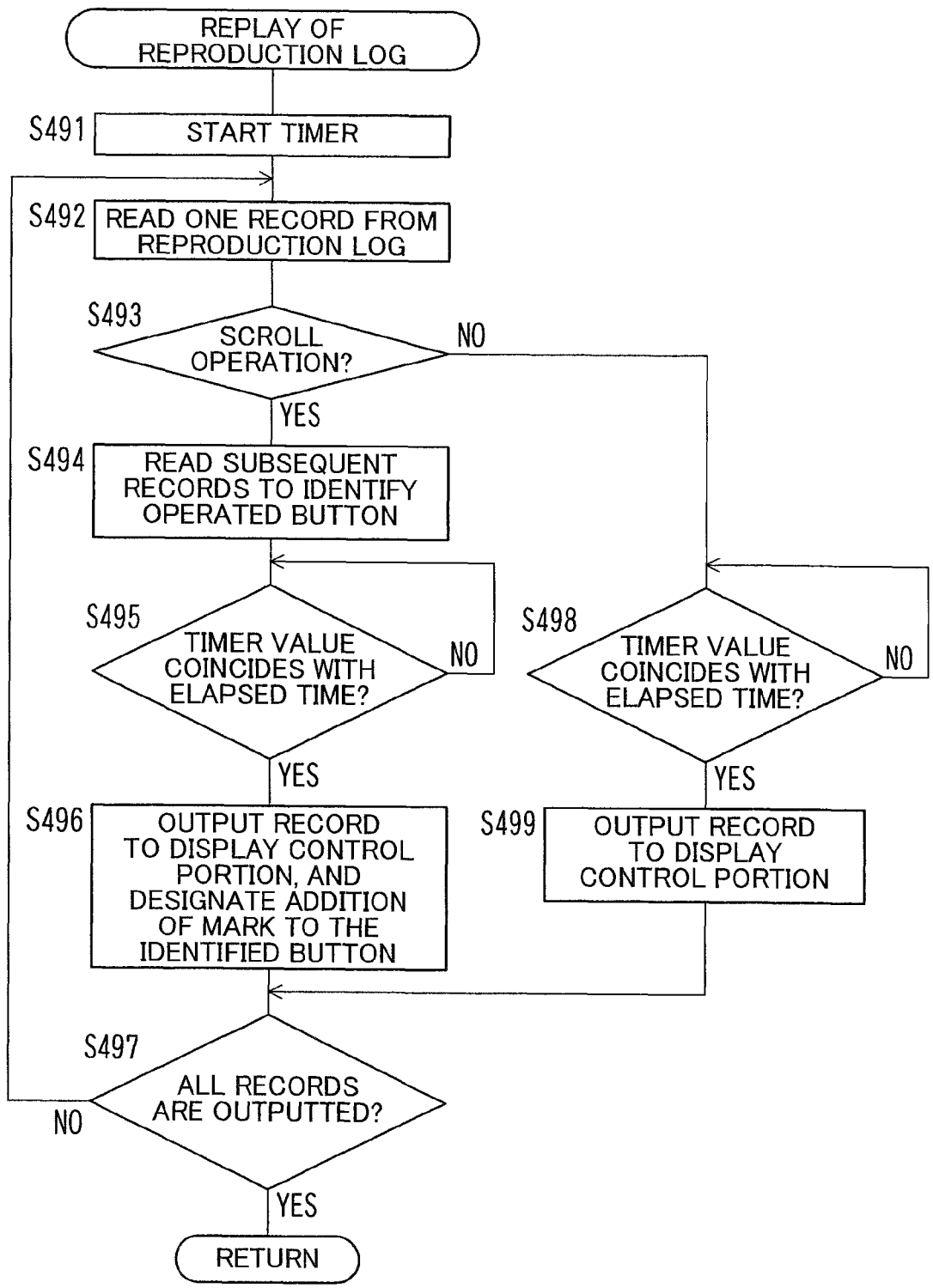
FIG. 26 is a flowchart depicting the flow of the replay routine to replay a reproduction log of FIG. 18.

FIG. 26 is a flowchart depicting the flow of the replay routine to replay a reproduction log of FIG. 18.

The CPU 24 starts a timer for counting the elapsed time since the replay was started (Step S491). The CPU 24 then reads thereinto one record selected in the numerical order from the reproduction log 250 (Step S492).

If the operation indicated in the read record is the scroll operation (YES in Step S493), then the CPU 24 reads thereinto the subsequent records to determine the type of operation; thereby to identify the tapped button 90 (Step S494). When the elapsed time indicated in the record read in Step S492 coincides with the timer value (Step S495), the CPU 24 outputs the record to the display control portion 28 (Step S496). At this time, the CPU 24 instructs the display control portion 28 to add the marks 98 and 99 to make the button 90 identified in Step S494 stand out.

On the other hand, unless the operation indicated in the read record is the scroll operation (NO in Step S493), when the elapsed time indicated in the record read in Step S492 coincides with the timer value (Step S498), the CPU 24 outputs the record to the display control portion 28 (Step S499).

The process from Step S492 through Step S499 is repeated until all the records of the reproduction log 250 are completely outputted (YES in Step S497).

Figure 27:
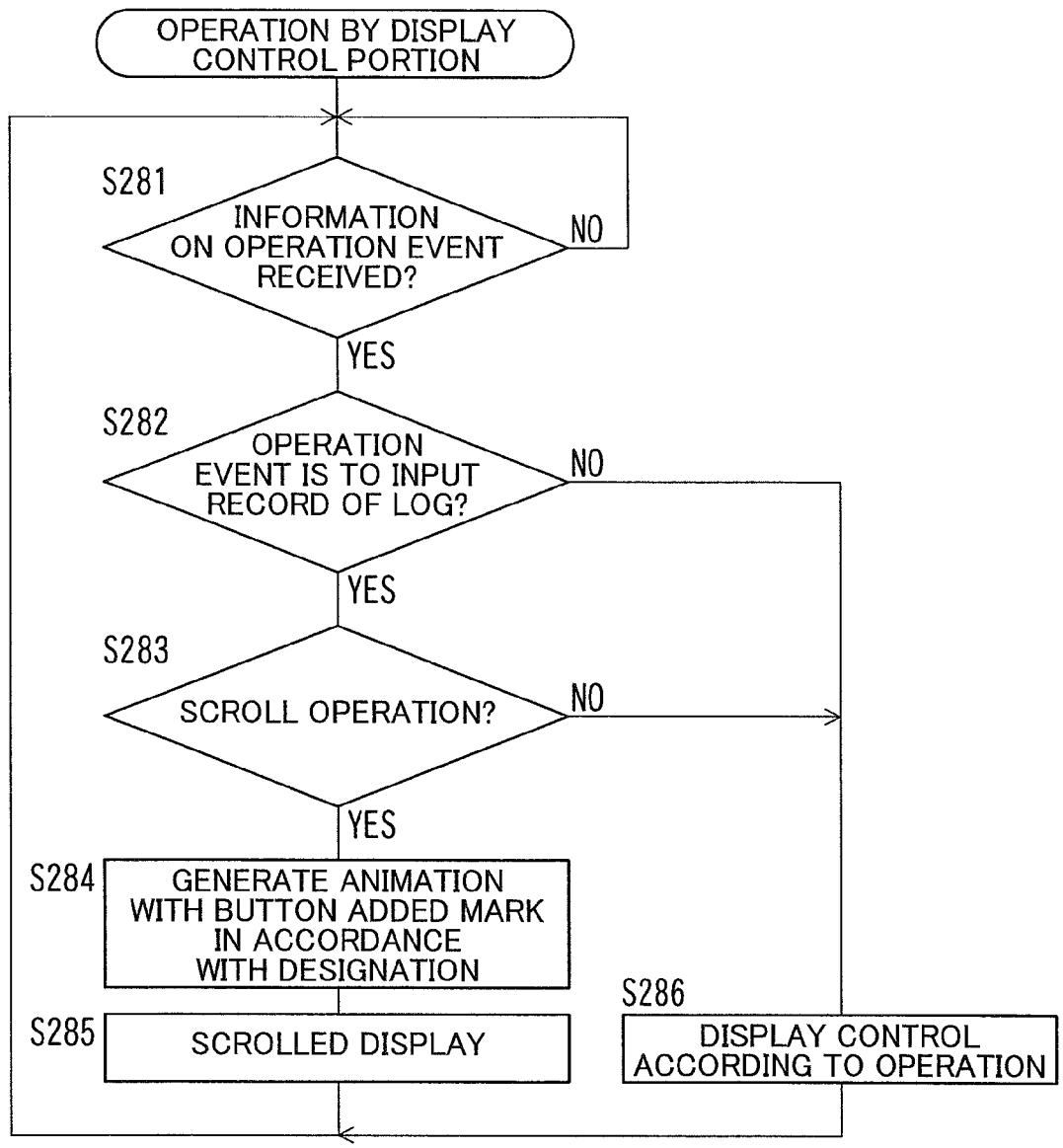
FIG. 27 is a flowchart depicting the flow of operation by a display control portion.

FIG. 27 is a flowchart depicting the flow of operation by the display control portion 28.

The display control portion 28 monitors a notification of an operation event sent from the input control portion 27 (Step S281). If receiving a notification of an operation event (YES in Step S281), then the display control portion 28 checks whether or not the operation event is to input a record of the reproduction log 250 (Step S282). If the operation event is not to input a record of the reproduction log 250 (NO in Step S282), then the display control portion 28, which has determined that a real-time operation using the operating panel 20 was performed, executes display control depending on the operation (Step S286).

The display control portion 28, which has determined that the operation event is to input a record of the reproduction log 250, checks whether or not the operation indicated in the entered record is the scroll operation (Step S283). If the operation indicated in the entered record is not the scroll operation (NO in Step S283), then the display control portion 28 executes display control depending on the operation in a manner similar to that for the real-time operation (Step S286).

If the operation indicated in the entered record is the scroll operation (YES in Step S283), then the display control portion 28 follows a command given by the CPU 24 to generate image data for animation showing that the button row 70 moves in the screen 43 having the marks 98 and 99 to make the button 90 stand out (Step S284). Based on the image data, the display control portion 28 displays an image continuously in the touch panel display 22. Thereby, the button row 70 scrolled is implemented.

In the foregoing embodiment, the example is taken in which the scroll direction M1 is the horizontal direction. Instead of this, the scroll direction M1 may be the vertical direction. In such a case, the X-coordinate value may be replaced with the Y-coordinate value to make a determination whether or not the scroll operation is the specific scroll operation.

In the foregoing embodiment, instead of generating a reproduction log 250 obtained by omitting, from the log 200, a record determined to be "replay unnecessary", a record may be so modified as to shorten a display time to display a screen corresponding to the record determined to be "replay unnecessary". In short, the log 200 may be replayed in such a manner that an operation determined to be "replay unnecessary" is accelerated. For example, when an operation indicated in the record determined to be "replay unnecessary" is flick, a speed shown as the other attributes 205 in the record is changed to be greater than the original value. Thereby, the button row 70 is scrolled through swiftly as if flick faster than the original flick were made. The elapsed time of the subsequent record may be modified so as to set the start time of display depending on the subsequent record ahead by a time length corresponding to the shortened display time for the flick.

In this embodiment, the following configuration is also possible. In the case where a scroll operation determined to be the specific scroll operation is started with the button 90 appearing in the display surface 220, and the scroll operation does not cause the button 90 to disappear from the display surface 220, a record corresponding to the scroll operation is added to the reproduction log 250. This enables display corresponding to the scroll operation not to be omitted. As discussed above, in this embodiment, where a screen displayed according to an operation is reproduced, it is possible to reduce unnecessary display.

In this embodiment, the example is described in which display according to a scroll operation other than the specific scroll operation is not omitted. Another configuration is possible in which, among scroll operations performed before an operation other than the scroll operation such as tapping onto the button 90, display according to the specific scroll operation and the subsequent scroll operation may be omitted, or, alternatively, the display time thereof may be shortened. For example, referring to the flowchart of FIG. 25, when the check result in Step S592 is the mode 1, instead of pursuing the process of Step S594, the CPU 24 may perform processing for determining the analysis result from the target record of the target list 300 to the second last record of the target list 300 to be "replay unnecessary". Immediately after that, the process may return to the processing of the flowchart of FIG. 24.

Yet another configuration is possible in which, among scroll operations performed before an operation other than the scroll operation, omitting the display and reducing the display time are not made for the first specific scroll operation, and instead, omitting the display and reducing the display time may be made for the second specific scroll operation and the subsequent scroll operation.

The following configuration is also possible. When the replay determination mode is the mode 1 or the mode 2, and when displaying the specific scroll operation is not omitted and the display time thereof is not shortened, it is possible to omit display according to a scroll operation after the specific scroll operation, or, alternatively, to shorten the display time thereof.

The items of the logs 200 and 250 are not limited to the examples and may be modified appropriately. For example, not the elapsed time but a time at which an operation event has occurred may be recorded.

The MFP 1 and the MFP 4 may be configured to use a medium other than the USB memory, e.g., an SD card, CompactFlash (registered trademark), semiconductor memory such as a memory stick, and magnetic card.

Instead of recording information on operation event as the log 200, it is possible to record, as a moving image, a transition of screens displayed as the operation is recorded. In replaying the moving image, a part corresponding to the specific scroll operation may be omitted or be forwarded fast.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. An image display device for reproducing an image displayed in a display surface according to a plurality of operations performed consecutively, the image display device comprising:

an extraction portion configured to extract, from historical data on the plurality of operations, first data on a plurality of times of first operations to give a command to scroll through the image, and second data indicating a position at which an operation is made in the display surface of an object selected from the image through second operation performed after the plurality of times of first operations;

a determination portion configured to determine whether or not the plurality of times of first operations include a specific scroll operation to give a command to scroll through the image in such a manner that the object moves from one side to another one side when viewed from the position indicated in the second data; and a reproduction portion configured to reproduce, when the determination portion determines that the plurality of times of first operations include the specific scroll operation, the image in accordance with the plurality of operations in such a manner that scrolling through the image is omitted or a time to scroll through the image is shortened in accordance with a target operation, the target operation being any one of the specific scroll operation and a subsequent first operation among the plurality of times of first operations.

2. The image display device according to claim 1, comprising a modification portion configured to generate reproduction historical data by modifying the historical data in a manner to omit data related to the target operation; wherein the reproduction portion reproduces the image in accordance with the reproduction historical data generated by the modification portion.

3. The image display device according to claim 2, comprising a saving portion configured to save the reproduction historical data generated by the modification portion to a storage portion in order to allow another image display device to obtain the reproduction historical data.

4. The image display device according to claim 1, wherein the reproduction portion reproduces an image in a manner to omit scrolling through the image in accordance with the specific scroll operation and all of subsequent operations among the plurality of times of first operations, or, alternatively, in a manner to shorten a time to scroll through the image.

5. The image display device according to claim 1, wherein, when the determination portion determines that the plurality of times of first operations include the specific scroll operation, the reproduction portion reproduces an image in a manner to omit scrolling through the image in accordance with all of specific scroll operations among the plurality of times of first operations, or, alternatively, in a manner to shorten a time to scroll through the image.

6. The image display device according to claim 1, wherein, when the specific scroll operation is to scroll the image to an end of the image, the reproduction portion does not omit scrolling through the image in accordance with the specific scroll operation.

7. The image display device according to claim 1, wherein the reproduction portion does not omit scrolling through the image in accordance with the specific scroll operation.

8. The image display device according to claim 1, wherein, when the specific scroll operation is started with the object appearing in the display surface, and when the specific scroll operation is operation not to disappear the object from the display surface, the reproduction portion does not omit scrolling through the image in accordance with the specific scroll operation.

9. The image display device according to claim 1, wherein, when the position is located between a relative position of the object with respect to the display surface at a time point when the first operation is performed and a relative position of the object with respect to the display surface immediately after scroll in accordance with the first operation, the determination portion determines that the first operation is the specific scroll operation.

10. The image display device according to claim 1, wherein the reproduction portion reproduces the image so as to make the object stand out.

11. The image display device according to claim 1, wherein, when the image is displayed together with a graphic showing an entirety of the image in a simplified manner, the reproduction portion displays a mark at a position corresponding to the object in the graphic.

12. The image display device according to claim 1, wherein
a first replay mode and a second replay mode are selectable,
when the first replay mode is selected, the reproduction portion omits scrolling thorough the image or shortens a time to scroll through the image in accordance with the target operation, and
when the second replay mode is selected, the reproduction portion does not omit scrolling thorough the image according to the plurality of times of first operations and does not shorten a time to scroll through the image.

13. The image display device according to claim 1, comprising an obtaining portion configured to obtain reproduction historical data generated by another image display device by modifying the historical data in a manner to omit data related to the target operation; wherein
the reproduction portion reproduces the image in accordance with a plurality of operations performed in said another image display device in accordance with the reproduction historical data obtained by the obtaining portion.

14. An image display system for reproducing an image displayed in a display surface according to a plurality of operations performed consecutively, the image display system comprising:
a first information device configured to perform display according to an operation; and
a second information device configured to perform display according to an operation; wherein
the first information device includes
an extraction portion configured to extract,
from historical data on the plurality of operations, first data on a plurality of times of first operations to give a command to scroll through the image, and second data indicating a position at which an operation is made in the display surface of an object selected from the image through second operation performed after the plurality of times of first operations,
a determination portion configured to determine whether or not the plurality of times of first operations include a specific scroll operation to give a command to scroll through the image in such a manner that the object moves from one side to another one side when viewed from the position indicated in the second data,
a modification portion configured to generate reproduction historical data by modifying the historical data in a manner to omit data related to at least one operation of the specific scroll operation and a subsequent operation among the first data, and
a saving portion configured to save the reproduction historical data generated by the modification portion to a memory; and
the second information device includes
an obtaining portion configured to obtain the reproduction historical data from the memory, and
a reproduction portion configured to cause the second information device to display an image in accordance with the reproduction historical data.

15. An image display method for reproducing an image displayed in a display surface according to a plurality of operations performed consecutively, the image display method comprising:
extracting, from historical data on the plurality of operations, first data on a plurality of times of first operations to give a command to scroll through the image, and second data indicating a position at which an operation is made in the display surface of an object selected from the image through second operation performed after the plurality of times of first operations;
determining whether or not the plurality of times of first operations include a specific scroll operation to give a command to scroll through the image in such a manner that the object moves from one side to another one side when viewed from the position indicated in the second data; and
reproducing, when it is determined that the plurality of times of first operations include the specific scroll operation, the image in accordance with the plurality of operations in such a manner that scrolling through the image is omitted or a time to scroll through the image is shortened in accordance with a target operation, the target operation being any one of the specific scroll operation and a subsequent first operation among the plurality of times of first operations.

16. The image display method according to claim 15, comprising
- generating reproduction historical data by modifying the historical data in a manner to omit data related to the target operation, and
- reproducing the image according to the plurality of operations in accordance with the reproduction historical data.

17. The image display method according to claim 15, comprising
- obtaining reproduction historical data generated by another image display device by modifying the historical data in a manner to omit data related to the target operation among the first data, and
- reproducing the image in accordance with a plurality of operations performed in said another image display device in accordance with the reproduction historical data obtained.

18. A non-transitory computer-readable storage medium storing thereon a computer program executed in an image display device for reproducing an image displayed in a display surface according to a plurality of operations performed consecutively, the computer program causing a computer provided in the image display device to execute:
- extraction processing for extracting, from historical data on the plurality of operations, first data on a plurality of times of first operations to give a command to scroll through the image, and second data indicating a position at which an operation is made in the display surface of an object selected from the image through second operation performed after the plurality of times of first operations;
- determination processing for determining whether or not the plurality of times of first operations include a specific scroll operation to give a command to scroll through the image in such a manner that the object moves from one side to another one side when viewed from the position indicated in the second data; and
- reproduction processing for reproducing, when it is determined that the plurality of times of first operations include the specific scroll operation, the image in accordance with the plurality of operations in such a manner that scrolling through the image is omitted or a time to scroll through the image is shortened in accordance with a target operation, the target operation being any one of the specific scroll operation and a subsequent first operation among the plurality of times of first operations.

19. The non-transitory computer-readable storage medium according to claim 18, comprising
- causing the computer to execute generation processing for generating reproduction historical data by modifying the historical data in a manner to omit data related to the target operation among the first data, wherein
- the reproduction processing includes reproducing the image according to the plurality of operations in accordance with the reproduction historical data.

20. The non-transitory computer-readable storage medium according to claim 18, comprising
- causing the computer to execute obtaining processing for obtaining reproduction historical data generated by another image display device by modifying the historical data in a manner to omit data related to the target operation among the first data, and
- causing the computer to execute second reproduction processing for reproducing the image in accordance with a plurality of operations performed in said another image display device in accordance with the reproduction historical data obtained.

* * * * *